US011916592B2

(12) United States Patent
Scott et al.

(10) Patent No.: US 11,916,592 B2
(45) Date of Patent: Feb. 27, 2024

(54) OPTICAL DATA COMMUNICATION SYSTEM

(71) Applicant: Honeywell Limited Honeywell Limitée, Mississauga (CA)

(72) Inventors: Alan Scott, Arnprior (CA); Thomas Ducellier, Ottawa (CA)

(73) Assignee: Honeywell Limited Honeywell Limitée, Mississauga (CA)

( * ) Notice: Subject to any disclaimer, the term of this patent is extended or adjusted under 35 U.S.C. 154(b) by 0 days.

(21) Appl. No.: 17/867,770

(22) Filed: Jul. 19, 2022

(65) Prior Publication Data

US 2023/0019858 A1 Jan. 19, 2023

(30) Foreign Application Priority Data

Jul. 19, 2021 (CA) ...................................... 3125140

(51) Int. Cl.
*H04B 10/00* (2013.01)
*H04B 10/118* (2013.01)
*H04B 10/112* (2013.01)

(52) U.S. Cl.
CPC ......... *H04B 10/118* (2013.01); *H04B 10/112* (2013.01)

(58) Field of Classification Search
CPC . H04B 10/118; H04B 10/112; H04B 10/1123; H04B 10/1125; H04B 10/1127; H04B 10/1129; H04B 10/40; H04B 10/29; H04B 10/114; H04B 10/1143; H04B 10/1149; H04B 7/18521; H04B 7/18513; H04B 7/18515; H04B 7/18584

(Continued)

(56) References Cited

U.S. PATENT DOCUMENTS 9,042,734 B2 * 5/2015 Makowski ......... H04B 10/1123
398/118
10,523,312 B1 12/2019 Tong et al.
(Continued)

FOREIGN PATENT DOCUMENTS

CN 112019258 A 12/2020

OTHER PUBLICATIONS

Xiaoxin Qi et al., "A Distributed Survivable Routing Algorithm for Mega-Constellations with Inclined Orbits", IEEE Access, USA, vol. 8, Nov. 30, 2020 pp. 219199-219213.

*Primary Examiner* — Hanh Phan

(57) ABSTRACT

A communication system has a plurality of LEO satellites in a specified orbital plane and a plurality of trunk satellites in a medium earth orbit. Each LEO satellite acquires satellite-specific data and includes inter-satellite links with adjacent LEO satellites. Each trunk satellite includes inter-satellite links adjacent trunk satellites. One of the trunk satellites operates as a relay trunk satellite in position to maintain optical communication with a specified ground station on the Earth. Each LEO satellite has a limited field of regard to establish optical communication with any trunk satellite. A relay LEO satellite is configured to establish optical communication with a corresponding trunk satellite. The plurality of LEO satellites relay aggregated data to the relay LEO satellite. The relay LEO satellite relays the aggregated data to the corresponding trunk satellite. The relay trunk satellite relays the received aggregated data to the corresponding ground station.

20 Claims, 9 Drawing Sheets

(58) Field of Classification Search
USPC ....... 398/118, 119, 120, 121, 122, 123, 124,
398/125, 126, 127, 128, 129, 130, 131,
398/135, 136, 115, 158, 159; 455/12.1,
455/13.1, 427, 428, 429, 430
See application file for complete search history.

(56) References Cited

U.S. PATENT DOCUMENTS

| | | |
|---|---|---|
| 10,575,229 B2 | 2/2020 | Wu et al. |
| 10,958,334 B1* | 3/2021 | Sullivan ................. H04B 7/195 |
| 2014/0016941 A1* | 1/2014 | Coleman ............ H04B 7/18521 |
| | | 398/121 |
| 2016/0269101 A1 | 9/2016 | Welle |
| 2016/0269116 A1 | 9/2016 | Welle et al. |
| 2017/0005719 A1 | 1/2017 | Krebs |
| 2017/0324465 A1 | 11/2017 | Sotom et al. |
| 2021/0092640 A1 | 3/2021 | Ravishankar et al. |
| 2022/0303008 A1* | 9/2022 | Takemoto ............ H04B 10/118 |

\* cited by examiner

OPTICAL DATA COMMUNICATION SYSTEM

FIELD

The present subject-matter relates to communication systems, and more particular to optical data communication systems using satellites.

INTRODUCTION

The following is not an admission that anything discussed below is part of the prior art or part of the common general knowledge of a person skilled in the art.

Satellite communication plays an increasingly important role in a number of industries. Constellations of satellites can be used for a wide variety of applications, including communication networks and Earth observation systems. These applications often involve large volumes of data being transmitted through satellite constellations. With increasing use and the increasing resolution of data being transmitted, the volume of data transmitted using satellite constellations is continuing to increase. As a result, links between the satellite constellations and ground-based communication systems must have sufficient bandwidth to manage the data volumes being transmitted.

Traditional RF downlinks typically do not provide sufficient bandwidth to capture all of the data being transmitted by satellites in large constellations. Optical intersatellite links on the other hand can typically support the bandwidth required for data downlinks. However, the use of optical intersatellite links still involves data being aggregated through the constellation. This can result in vast volumes of data that may overwhelm even optical links. Methods for effectively managing data transfer within satellite constellations are desirable to further improve the utility of these systems.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with this disclosure, a communication system includes a plurality of LEO satellites in low earth orbit. The LEO satellites can be arranged along one or more LEO orbital planes. The LEO satellites within the same LEO orbital plane can establish a chain of LEO inter-satellite links that allows data to be transmitted, aggregated, and forwarded throughout the set of LEO satellites within the same LEO orbital plane. The communication system also includes a plurality of trunk satellites in a medium earth orbit along a specified MEO orbital plane. Each LEO satellite has an optical terminal with a limited field of regard that is capable of establishing optical communication with a corresponding trunk satellite. Limiting the field of regard of the LEO optical terminal simplifies the design and construction of the pointing gimbal for the LEO satellites. This also ensures that the LEO satellites are relatively nearby to a corresponding trunk satellite when transmitting data thereto, reducing the power required to transmit data to the trunk satellite.

A relay LEO satellite can establish optical communication with a corresponding trunk satellite while the corresponding trunk satellite is within the limited field of regard. The relay LEO satellite can receive aggregate data from other LEO satellites within the same LEO orbital plane and relay that aggregated data to the corresponding trunk satellite. Data from multiple LEO satellites can be transmitted to the trunk satellite through a single relay LEO satellite. This allows the corresponding trunk satellite to monitor only a subset of the LEO satellites in an orbital plane, reducing the number of optical terminals required by the trunk satellite.

A relay trunk satellite can establish optical communication with a specified ground station on the Earth. The plurality of trunk satellites can aggregate and forward the data received from the relay LEO satellite(s) to the relay trunk satellite. The relay trunk satellite can, in turn, relay the received aggregate satellite-specific data to the corresponding ground station. Through the combined relaying in both the LEO orbital plane and the trunk orbital plane, the design of both the LEO satellites and the trunk satellites can be simplified while accommodating high data throughput.

In an aspect of this disclosure, there is provided a communication system comprising: a plurality of LEO satellites in low-earth orbit around Earth in a specified LEO orbital plane, the plurality of LEO satellites spaced apart from one another along the specified orbital plane, wherein each LEO satellite is configured to acquire satellite-specific data and each LEO satellite includes LEO inter-satellite links with at least one other LEO satellite in the specified LEO orbital plane; and a plurality of trunk satellites in a medium earth orbit around Earth in a specified MEO orbital plane, wherein each trunk satellite includes MEO inter-satellite links with at least one other trunk satellite in the specified MEO orbital plane, wherein at any time at least one of the trunk satellites operates as a relay trunk satellite in position to maintain optical communication with a specified ground station on the Earth; wherein each LEO satellite has a limited field of regard to establish optical communication with any trunk satellite in the plurality of trunk satellites; a relay LEO satellite from the plurality of LEO satellites is configured to establish optical communication with a corresponding trunk satellite at a given time; the plurality of LEO satellites are configured to provide aggregate satellite-specific data to the relay LEO satellite by relaying the satellite specific data from each LEO satellite in at least a portion of the specified orbital plane to that relay LEO satellite; the relay LEO satellite is configured to relay the aggregate satellite-specific data to the corresponding trunk satellite; and the relay trunk satellite is configured to relay the received aggregate satellite-specific data to the corresponding ground station.

In some examples, for each at least a portion of the specified orbital plane at least one of the LEO satellites in that at least a portion of the specified orbital plane is not in optical communication with any trunk satellite at every given time.

In some examples, the corresponding trunk satellite may be different from the relay trunk satellite and the plurality of trunk satellites can be configured to relay the received aggregate satellite-specific data to the relay trunk satellite using the MEO inter-satellite links.

In some examples, the plurality of LEO satellites may be configured to provide aggregate satellite-specific data to the relay LEO satellite by relaying the satellite specific data from each LEO satellite in a quarter of the specified orbital plane to that relay LEO satellite.

In some examples, the plurality of LEO satellites may be configured to provide aggregate satellite-specific data to the relay LEO satellite by relaying the satellite specific data from each LEO satellite in a half of the specified orbital plane to that relay LEO satellite.

In some examples, the plurality of LEO satellites in the specified LEO orbital plane can include at least 9 LEO satellites.

In some examples, the relay LEO satellite may be the LEO satellite nearest to the corresponding trunk satellite at that given time.

In some examples, the relay satellite may be the satellite in the portion of the specified orbital plane that is closest to the equator at the given time.

In some examples, for each LEO satellite, that LEO satellite can include LEO inter-satellite links with a first adjacent LEO satellite and a second adjacent LEO satellite, where the first adjacent LEO satellite is spaced apart from that LEO satellite in a first direction along the specified LEO orbital plane, and the second adjacent LEO satellite is spaced apart from that LEO satellite in a second direction along the specified LEO orbital plane.

In some examples, each LEO satellite may be operable to relay data in either direction around the specified LEO orbital plane.

In some examples, the plurality of trunk satellites in the specified MEO orbital plane can include at least four trunk satellites.

In some examples, the plurality of trunk satellites in the specified MEO orbital plane can include at least eight trunk satellites.

In some examples, the specified MEO orbital plane may be proximate the equator.

In some examples, each trunk satellite may be operable to relay data in either direction around the specified MEO orbital plane.

In some examples, each trunk satellite may be operable to concurrently relay data in both directions around the specified MEO orbital plane.

In some examples, the limited field of regard may be at most +/−45 degrees around a zenith of each LEO satellite.

In accordance with this disclosure, a satellite configured for low-earth orbit along a specified orbital plane can include a pair of intraorbital optical terminals usable to establish intraorbital optical data links with adjacent satellites along the same specified orbital plane. The pair of intraorbital optical terminals can be using fore- and aft-pointing OISL terminals. The satellite can also include an uplink optical terminal with a limited field of regard that can be used to establish an optical link to the trunk satellite. The satellite can operate in a first mode of operation in which the satellite acquires satellite-specific data using a data acquisition terminal and relays the satellite-specific data to at least one of the adjacent satellites in the same orbital plane using at least one of the intraorbital optical terminals. This relayed data can be routed to a trunk satellite via one of the other satellites in the same orbital plane. The satellite can also operate in a second mode of operation in which the satellite receives aggregate satellite-specific data from at least one of the adjacent satellites in the same orbital plane and relays the aggregate satellite-specific data to the trunk satellite using the uplink optical terminal. This simplifies the design and control of the uplink optical terminal as the satellite is only required to maintain a communication link with the trunk satellite for a limited portion of the satellite's orbit.

In an aspect of this disclosure, there is also provided a satellite usable to orbit Earth along a specified orbital plane comprising: a plurality of terminals, the plurality of terminals including at least a pair of intraorbital optical terminals and a plurality of additional terminals including a first additional terminal and a second additional optical terminal, wherein each intraorbital optical terminal is operable to establish an intraorbital optical data link to an adjacent satellite within the same specified orbital plane, and each additional terminal is operable to establish an additional data link to a location external to the specified orbital plane; a processor configured to operate the satellite in a first mode of operation and a second mode of operation, wherein in the first mode of operation, the satellite is configured to acquire satellite-specific data using the first additional terminal and to relay the satellite-specific data to at least one of the adjacent satellites in the same orbital plane using at least one of the intraorbital optical terminals; in the second mode of operation, the satellite is configured to receive aggregate satellite-specific data from at least one of the adjacent satellites in the same orbital plane and to relay the aggregate satellite-specific data to a trunk satellite in a different altitude of orbit around Earth using the second additional optical terminal; wherein the second additional optical terminal has a limited field of regard to establish the additional optical link to the trunk satellite.

In some examples, the satellite may be configured to orbit Earth in a low-earth orbit and the trunk satellite is configured to orbit Earth in a medium earth orbit.

In some examples, the satellite may be configured to orbit Earth in a specified low-earth orbital plane and to establish data communication with a plurality of additional LEO satellites spaced apart from the satellite along the specified low-earth orbital plane using the intraorbital optical terminals; and the satellite may be configured to: determine whether the satellite is a relay satellite in communication with the trunk satellite at a given time; operate in the first mode of operation at the given time in response to determining that the satellite is not the relay satellite at the given time; and operate in the second mode of operation at the given time in response to determining that the satellite is the relay satellite at the given time.

In some examples, the relay satellite may be identified as the particular satellite within the specified low-earth orbital plane nearest to the trunk satellite at the given time.

In some examples, the relay satellite may be identified as the particular satellite within the specified low-earth orbital plane nearest to the equator at the given time.

In some examples, in the first mode of operation the satellite may be operable to relay the satellite-specific data using either of the intraorbital optical terminals.

In some examples, in the first mode of operation, the satellite may be operable to determine a nearest relay satellite in communication with the trunk satellite at a given time, and to select one of the intraorbital optical terminals for use in relaying the satellite-specific data based on a relative position of the satellite and the nearest relay satellite.

In some examples, in the second mode of operation, the satellite may be operable to receive data from the additional LEO satellites in ¼ of the specified low-earth orbital plane.

In some examples, in the second mode of operation, the satellite may be operable to receive data from the additional LEO satellites in ½ of the specified low-earth orbital plane.

In some examples, the limited field of regard may be at most +/−45 degrees around a zenith of the satellite while in orbit.

In some examples, in the first mode of operation the satellite may be further configured to receive aggregate satellite-specific data from at least one of the adjacent satellites in the same orbital plane.

In some examples, in the second mode of operation the satellite may be further configured to acquire satellite-specific data using the first additional terminal.

In an aspect of this disclosure, there is also provided a satellite configured to orbit Earth along a specified medium-earth orbital plane comprising: a plurality of optical terminals, the plurality of optical terminals including at least a pair of intraorbital optical terminals and a plurality of additional optical terminals including at least one first additional optical terminal and a second additional optical terminal, wherein each intraorbital optical terminal is operable to establish an optical inter-link to an adjacent satellite within the same specified orbital plane, and each additional optical terminal is operable to establish an optical link to a different optical communication system external to the specified orbital plane; and a processor configured to operate the satellite to: establish an optical data link with at least one relay satellite in a different altitude of orbit around Earth using the at least one first additional optical terminal; receive aggregate satellite-specific data from each of the at least one relay satellite; establish optical data links with a plurality of additional MEO satellites spaced apart from the satellite along the specified medium-earth orbital plane using the intraorbital optical terminals; operate in a first mode of operation, wherein in the first mode of operation the satellite is configured to receive relayed aggregate satellite-specific data from at least one of the additional MEO satellites and to relay the relayed aggregate satellite-specific data to a ground-based optical communication system using the second additional optical terminal; operate in a second mode of operation, wherein in the second mode of operation, the satellite is configured to forward aggregate satellite-specific data to at least one of the additional MEO satellites using the intraorbital optical terminals.

In some examples, the processor may be configured to: determine whether the satellite is a ground relay satellite in communication with the ground-based optical communication system at a given time; operate the satellite in the second mode of operation at the given time in response to determining that the satellite is not the ground relay satellite at the given time; and operate the satellite in the first mode of operation at the given time in response to determining that the satellite is the ground relay satellite at the given time.

In some examples, the satellite may be operable to relay the aggregate satellite-specific data using either of the intraorbital optical terminals.

In some examples, the satellite may be operable to relay the aggregate satellite-specific data using both of the intraorbital optical terminals concurrently.

In some examples, the at least one first additional optical terminal can include a plurality of first additional optical terminals, and the satellite may be operable to establish concurrent optical communication links with a plurality of relay satellites using the plurality of first additional optical terminals.

In some examples, the plurality of first additional optical terminals can include at most six first additional optical terminals.

It will be appreciated by a person skilled in the art that a device, method or computer program product disclosed herein may embody any one or more of the features contained herein and that the features may be used in any particular combination or sub-combination. Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

DESCRIPTION OF VARIOUS EMBODIMENTS

Figure 1:
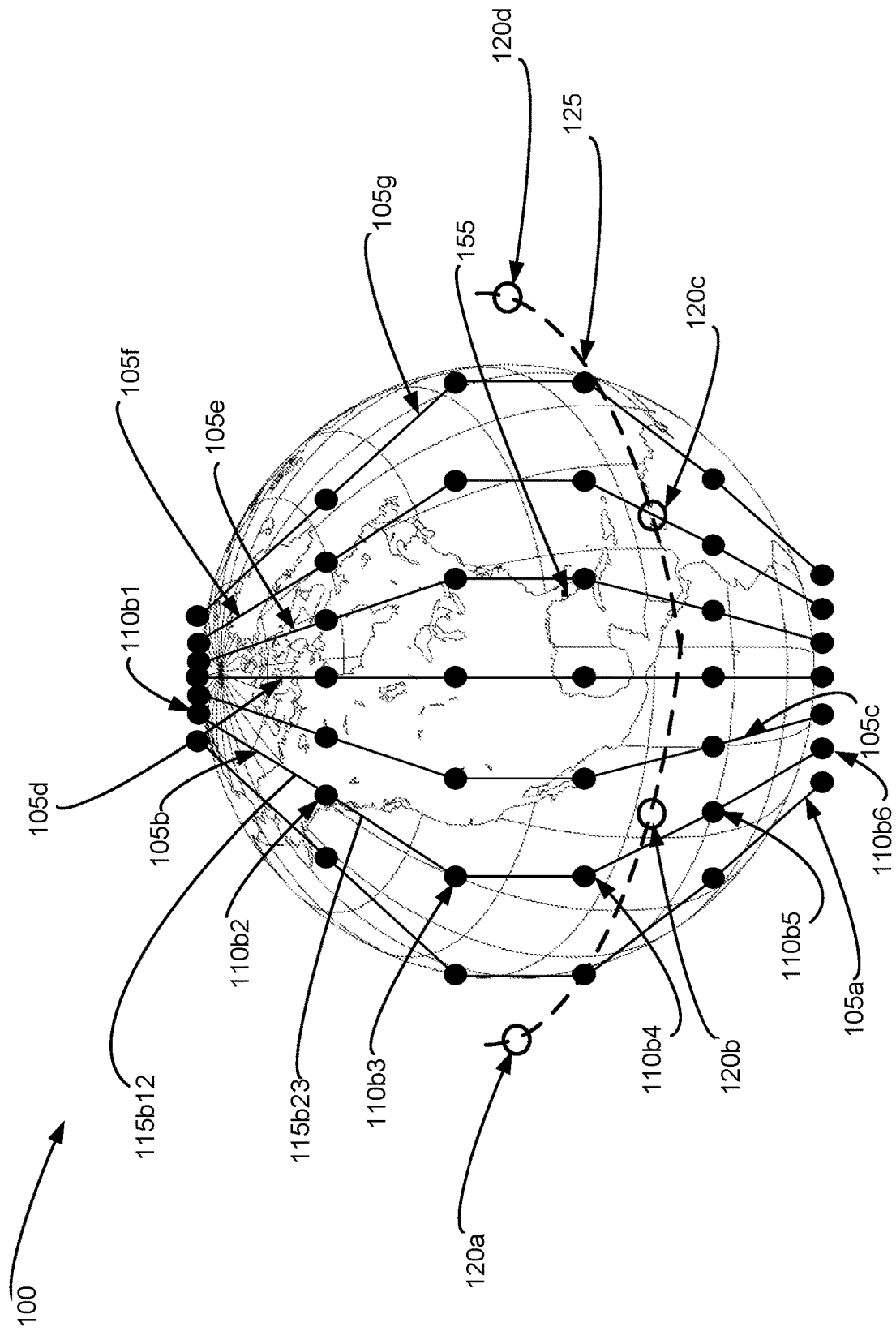
FIG. 1 is a block diagram illustrating an example of an optical data communication system.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

In the description and drawings herein, reference may be made to a Cartesian co-ordinate system in which the vertical direction, or z-axis, extends in an up and down orientation from bottom to top. The x-axis extends in a first horizontal or width dimension perpendicular to the z-axis, and the y-axis extends cross-wise horizontally relative to the x-axis in a second horizontal or length dimension.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Some elements herein may be identified by a part number, which is composed of a base number followed by an alphabetical or alphanumerical suffix (e.g. 105a, or 110b1). Multiple elements herein may be identified by part numbers that share a base number in common and that differ by their suffixes (e.g. 105a, 105b, and 105c). All elements with a common base number may be referred to collectively or generically using the base number without a suffix (e.g. 105).

Satellite networks allow data to be transmitted between locations across the globe. Networks of satellites can rapidly transmit data between locations on opposite sides of the globe, including locations on land, at sea and in the air.

For example, satellite networks can be used to provide telecommunication systems that enable point-to-point data connectivity coverage across the planet. Satellite networks can also be used for data acquisition applications, such as Earth observation activities. For example, constellations of high resolution Earth Observation satellites play an important role in various industries and applications.

To facilitate data transmission over large distances, networks of satellites can be used to route data. A number of satellite constellations are being launched in low earth orbit to facilitate the transmission of data across the globe. There is an ongoing need to improve the communication capabilities of satellites used in these satellite constellations. These satellite constellations may include many hundreds of satellites in orbit around the Earth. The satellites in each satellite constellation can be inter-connected through communication links to provide linked communication networks in the sky (e.g. in low-earth orbit). These inter-linked satellite communication networks may enable global data transmission capability from any point on the planet (land, sea or air) to any other point on the planet by transmitting data across multiple satellites.

The satellites in these networks can be configured to communicate with neighboring satellites through optical inter-satellite links. To facilitate communication through these networks, each satellite can include multiple communication terminals to provide links to multiple neighboring satellites.

Satellite communication links are being developed based on optical communication technologies rather than radio-frequency communications. Free space optical (FSO) links allow for exchange of data across air mediums and/or a vacuum. FSO links may be deployed, for example, to facilitate exchange of data between satellites, satellites and stationary and/or mobile ground terminals, various ground terminals, various airborne objects (e.g., aircrafts) as well as between satellites and either airborne objects or ground terminals.

The use of optical communication technologies provides orders of magnitude larger communication bandwidth as compared to RF communications. For example, to provide desired throughput levels (e.g. throughput in excess of 10 Gb/s), satellites may include laser-based communication systems. Traditional RF downlinks do not have sufficient bandwidth to capture all of the data being collected. Optical links also avoid difficulties associated with spectrum licensing. Optical communications are also very precise and do not diffract as much as communications using radio-frequency spectrum.

While optical intersatellite links provide for greater data throughput, at least compared to RF links, some applications may still push the limits of these data transmission links. Some applications of satellite networks may require data to be routed to one or more specified ground stations. For instance, certain applications may require the data acquired through a satellite network to be secured using ground stations at specified secure locations (e.g. within national borders). As a result, the data collected by the satellites within a constellation needs to be aggregated and routed through the satellite constellation to the specified ground station locations. This can result in vast volumes of data that may overwhelm even optical links.

Existing systems for managing this large volume of data require all of the satellites in a given constellation to be optically linked to one or more trunk satellites capable of handling higher data throughput. These trunk satellites then collect the aggregated data and transfer the data to the specified ground stations.

However, establishing optical links to a trunk satellite for each individual satellite requires a significant number of optical terminals, and a complex scheduling and tracking algorithm. The design of a pointing gimbal for the individual satellites also becomes complex, as each satellite needs to maintain contact with a trunk satellite at all positions in its orbit. Furthermore, the distance between the individual satellites and the trunk satellites is often quite large. As a result, each satellite needs to constantly supply high levels of power into the data link to transfer data to the trunk satellite. Accordingly, alternative methods of managing large volumes of data in satellite constellation are desirable.

Embodiments described herein may alleviate some of the challenges associated with existing methods of aggregating data within a satellite constellation. In embodiments described herein, a satellite constellation can be provided with one or more orbital planes of LEO satellites and at least one orbital plane of MEO trunk satellites. Each orbital plane of LEO satellites can aggregate observational data around the loop towards the relay LEO satellite in communication with an MEO trunk satellite using onboard optical intersatellite link (OISL) terminals.

For example, the MEO trunk satellites may orbit along an orbital plane near the equator. The orbital plane of LEO satellites can aggregate observational data around the loop towards the relay LEO satellite nearest the equator using fore- and aft-pointing OISL terminals, and the LEO satellite closest to the equator can make the link to the MEO trunk satellites. This may allow the data rates in the LEO satellite transceivers to be reduced by requiring the LEO satellite transceivers to aggregate only a half loop, or even only a quarter loop, worth of data acquired by the LEO satellites.

In embodiments described herein, LEO satellites can be configured with an uplink optical terminal having a limited field of regard (FOR) to establish a link to the MEO trunk satellite. The FOR can be limited to a narrow cone centered on the zenith of the satellite. This can significantly simplify the pointing gimbal design for the LEO satellites. However, due to the aggregation of data around the LEO orbital plane, this simplified gimbal design can still provide each LEO satellite with connectivity to the MEO trunk satellites. In the absence of data aggregation to the relay LEO satellite, each LEO satellite would require twice the number of optical terminals or would need to be flipped upside down as it traverses its orbit in order to maintain connectivity to the MEO trunk satellites. However, embodiments described herein can avoid these undesirable situations.

Embodiments described herein may also enable each trunk satellite to monitor only a fraction of the number of LEO satellites that it would otherwise need. For example, instead of monitoring all of the LEO satellites in a given orbital plane, an MEO trunk satellite may monitor only the 1 or 2 LEO satellites in closest proximity thereto (e.g. the 1-2 LEO satellites nearest the equator) within that orbital plane. This can significantly reduce the number of optical terminals required by the MEO satellite.

For example, a satellite constellation may include eight LEO orbital planes of LEO satellites with fourteen LEO satellites in each LEO orbital plane. This satellite constellation may be serviced by a MEO orbital plane of eight trunk satellites. Each MEO satellite can be configured to monitor the 1-2 LEO satellites nearest the equator in 2-3 orbital planes. Each trunk satellite would need a maximum of 4-6 optical terminals to monitor these LEO satellites. This would allow for handoffs between LEO satellites without data interruption from each plane as the satellites continue their orbits and pass out of a specified FOR (e.g. a 30-45 degree cone angle from a nadir of the MEO trunk satellite or in other words a 30-45 degree cone angle from the LEO satellite centered on the zenith of the LEO satellite). Without LEO aggregation of data, the MEO satellite would need to monitor 14 LEO satellites continuously. Accounting for handoffs and spares, the MEO satellite might need 16-20 optical terminals to collect all of the data acquired by the LEO satellites.

In embodiments described herein, the MEO trunk satellites can be configured to relay data in in opposite directions around the MEO orbital plane. This can minimize overall bandwidth requirements while providing a level of redundancy in case of an MEO satellite failure.

Figure 8:
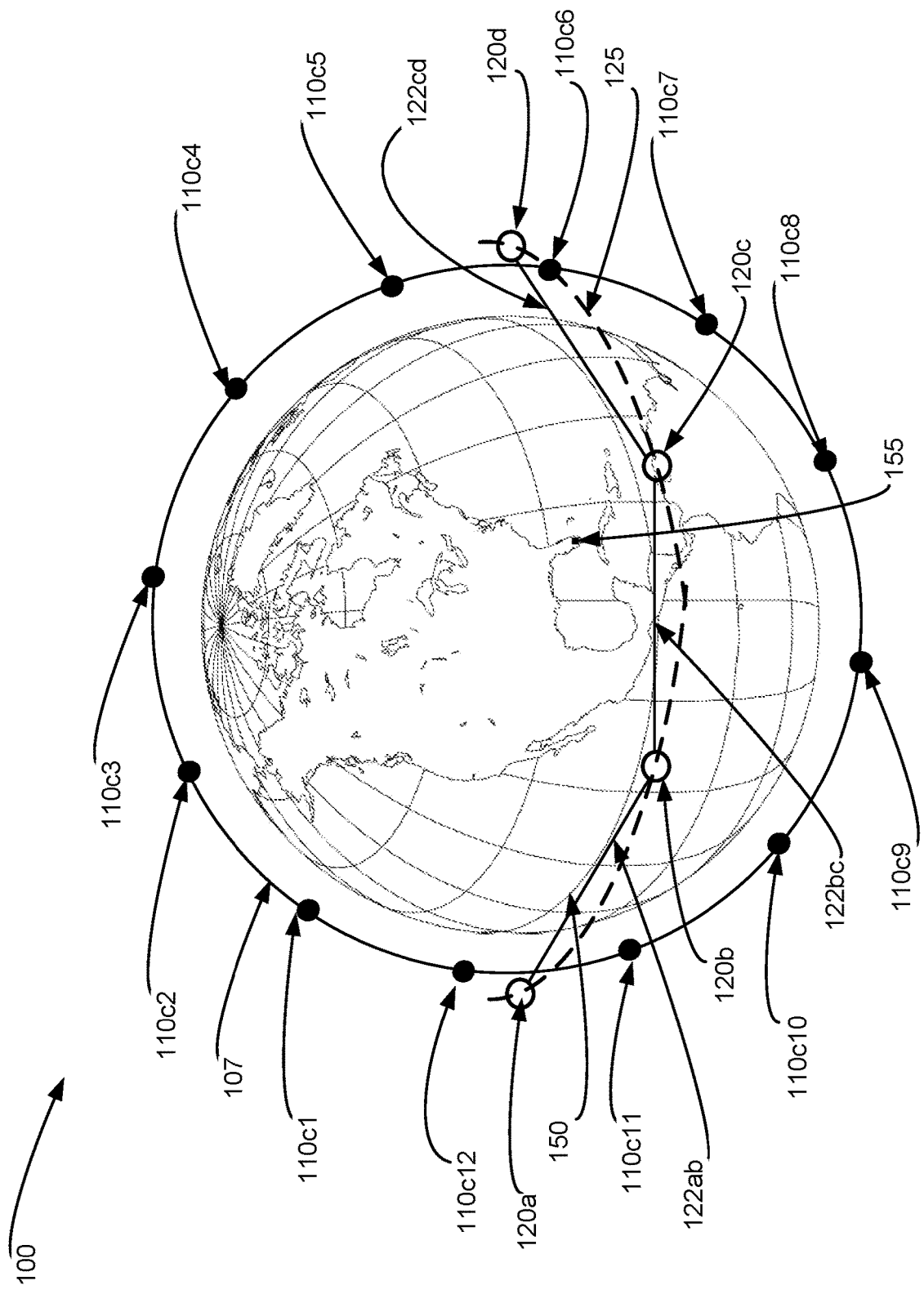
FIG. 8 is a block diagram illustrating a portion of the optical data communication system of FIG. 1.

Referring now to FIGS. 1 and 8, shown therein is an example optical data communication system 100 in accordance with embodiments provided herein. As shown in FIG. 1, the communication system 100 can include a plurality of LEO satellites 110 in geocentric low-earth orbit around the Earth and a plurality of trunk satellites 120 in geocentric medium-earth orbit around the Earth. In general, a low-earth orbit may be understood as a geocentric orbit with an altitude below about 2,000 km (1,200 mi). A medium earth orbit may be understood as a geocentric orbit with an altitude in a range from 2,000 km (1,200 mi) to just below geosynchronous orbit at 35,786 kilometers (22,236 mi).

The plurality of LEO satellites 110 can be arranged in one or more specified LEO orbital planes 107. In the example illustrated in FIG. 1, the plurality of LEO satellites 110 includes multiple sets 105a-105g of LEO satellites 110 in seven specified orbital planes, although it should be understood that a greater or lesser number of orbital planes may be used in various embodiments of the communication systems described herein. It should also be understood that the links shown in FIG. 1 between the satellites 110 within a given set 105 of LEO satellites 110 reflect the communication links between the LEO satellites 110 rather than the orbital plane itself. However, an example of LEO satellites 110 arranged along an orbital plane 107 is illustrated in FIG. 8.

In addition, it should be appreciated that additional satellites 110 that are not visible in FIG. 1 may be included along the specified orbital planes, for instance satellites 110 that would be obscured by the earth due to their current position along the orbital plane. In general, the plurality of LEO satellites 110 within a specified orbital plane can be spaced apart substantially evenly along the entire length of the orbital plane as shown in the example of orbital plane 107.

Typically, the communication system 100 may include at least 9 LEO satellites within a specified orbital plane. A specified orbital plane may typically include a minimum of 9-10 LEO satellites 110. More typically, however, a specified orbital plane may include at least 10 LEO satellites 110. For example, existing LEO satellite constellation configurations have been proposed that include 11, 14, 22, and 36 LEO satellites although it should be understood that different numbers of LEO satellites 110 may be included in specified orbital planes in embodiments described herein.

An orbital plane set 105 of LEO satellites 110 can be spaced apart from one another along the corresponding specified orbital plane. For instance, set 105b includes a plurality of LEO satellites 110b1-110b6 (collectively referred to as LEO satellites 110b) spaced apart from one another along a corresponding orbital plane (not shown). Each of the LEO satellites 110b can include an LEO inter-satellite link 115b with at least one other LEO satellite 110b in the specified LEO orbital plane. For example, as illustrated, LEO satellite 110b1 includes an LEO inter-satellite link 115b12 with LEO satellite 110b2, LEO satellite 110b2 also includes an additional LEO inter-satellite link 115b23 with LEO satellite 110b3, LEO satellite 110b3 also includes an additional LEO inter-satellite link 115b34 with LEO satellite 110b4, LEO satellite 110b4 also includes an additional LEO inter-satellite link 115b45 with LEO satellite 110b5, and LEO satellite 110b5 also includes an additional LEO inter-satellite link 115b56 with LEO satellite 110b6.

It should be understood that the LEO satellite 110b1 and 110b6 can also include additional LEO inter-satellite links with LEO satellites 110b not visible in FIG. 1. In general, the plurality of LEO satellites 110 within a specified orbital plane can include inter-satellite links that together span the entirety of the orbital plane (see e.g. orbital plane 107 shown in FIG. 8). This may allow the LEO satellites 110 within a specified orbital plane 105 to aggregate and forward data to any of the other LEO satellites within the same orbital plane via the series of inter-satellite links.

Each of the LEO satellites 110 can be configured to acquire satellite-specific data. That is, each LEO satellite 110 can be configured to acquire and/or receive data/signals from locations and/or systems external to the LEO satellites within the same orbital plane. For example, each LEO satellite 110 may be configured to receive communication signals from external communication systems such as ground-based communication devices (e.g. ground stations, mobile devices etc.). Alternately or in addition, each LEO satellite 110 may be configured to acquire signals from specified locations (e.g. images of specific locations on Earth). The LEO satellites 110 can use the inter-satellite links within the specified orbital plane to transmit, forward and aggregate the satellite-specific data from a portion, or from all, of the LEO satellites 110 within the specified orbital plane. This aggregated satellite-specific data may then be transmitted to one or more trunk satellites 120. The trunk satellites 120 may, in turn, route the aggregated satellite-specific data to specified ground stations 155.

For example, satellite-specific data acquired by LEO satellites 110b2 may be routed to a relay satellite 110b4 (along with satellite-specific data acquired by other LEO satellites 110b, such as LEO satellites 110b3). The relay satellite 110b4 may then relay the aggregate satellite-specific data from the LEO satellites 110b2 and 110b3 to the trunk satellite 120b. The trunk satellite 120b may, in turn, route the received aggregate satellite-specific data to relay trunk satellite 120c. The relay trunk satellite 120c can then route the received aggregate satellite-specific data to ground station 155.

The plurality of trunk satellites 120 can also be arranged in into a specified MEO orbital plane 125. In the example illustrated in FIG. 1, the trunk satellites 120 are arranged into a single MEO orbital plane 125 proximate the equator 150. It should be appreciated that additional trunk satellites 120 that are not visible in FIG. 1 may be included along the MEO orbital plane 125, for instance satellites 120 that would be obscured by the earth due to their current position along the MEO orbital plane 125. In general, the plurality of trunk satellites 120 can be spaced apart substantially evenly along the entire length of the MEO orbital plane 125.

As shown in FIG. 8, each of the trunk satellites 120 can include an MEO inter-satellite link 122 with at least one other trunk satellite 120 in the specified MEO orbital plane 120. For example, as illustrated, trunk satellite 120a includes an MEO inter-satellite link 122ab with trunk satellite 120b, trunk satellite 120b also includes an additional MEO inter-satellite link 122bc with trunk satellite 120c, trunk satellite 120c also includes an additional MEO inter-satellite link 122cd with trunk satellite 120d.

Figure 2:
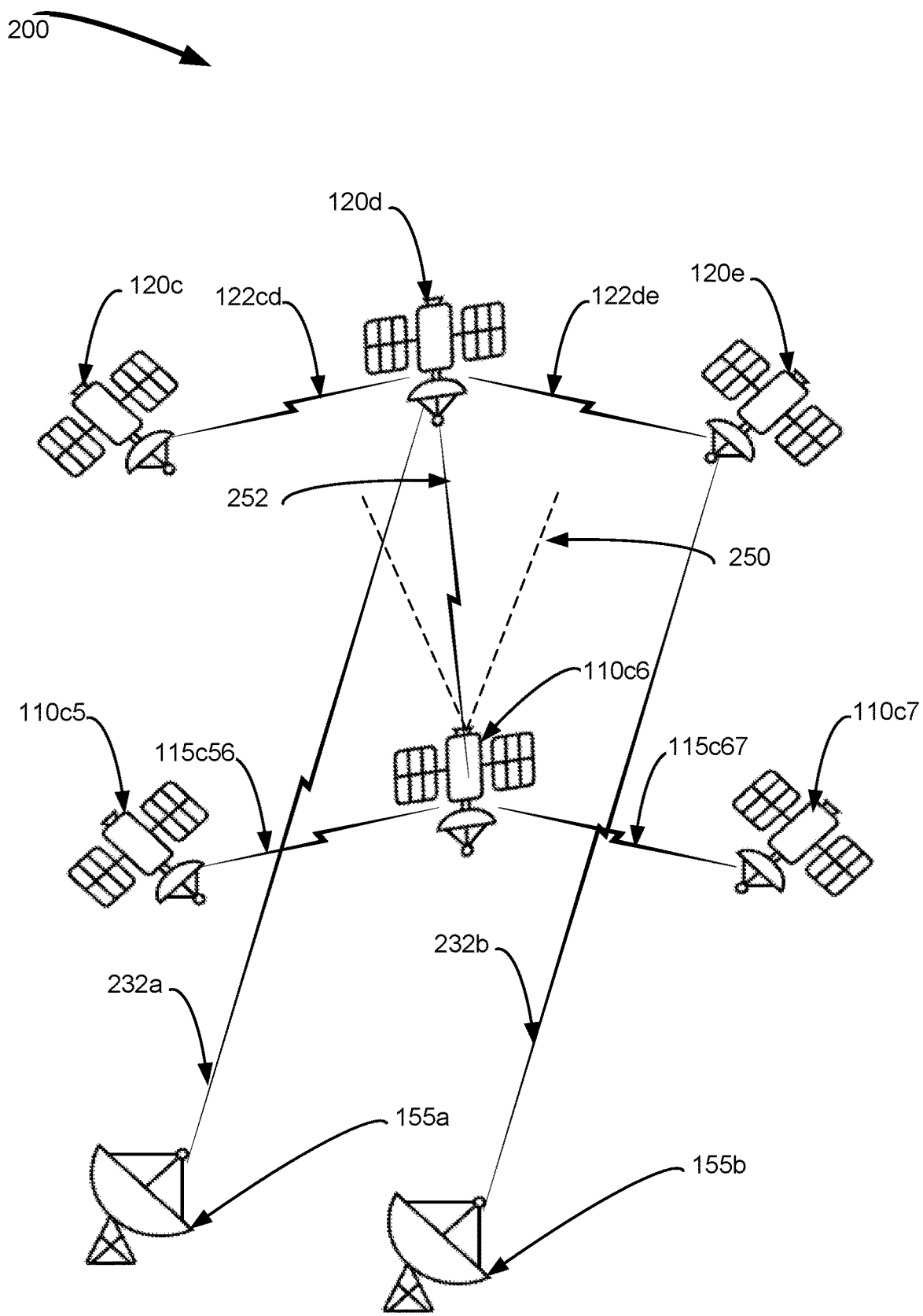
FIG. 2 is a block diagram illustrating a portion of the optical data communication system of FIG. 1.

It should be understood that the trunk satellites 120a and 120d can also include additional MEO inter-satellite links 122 with trunk satellites 120 not visible in FIG. 1 or 8 (see e.g. MEO inter-satellite link 122de shown in FIG. 2). In general, the plurality of trunk satellites 120 within the MEO orbital plane 125 can include inter-satellite links 122 that together span the entirety of the orbital plane 125. This may allow the trunk satellites 120 to aggregate and forward data to any of the other trunk satellites within the MEO orbital plane via the series of inter-satellite links 122. The trunk satellites 120 can establish bidirectional MEO inter-satellite links 122 where each trunk satellite 120 can transmit data in either direction around the MEO orbital plane 125. This may help reduce bandwidth requirements by allowing the trunk satellites 120 to transmit data to a desired relay trunk satellite using the shortest path (or the lowest traffic path). In some cases, the bidirectional transmission capability may also provide redundancy by allowing the trunk satellites 120 to transmit data to a desired relay trunk satellite in either direction to account for any possible faults or failures in the MEO inter-satellite links 122.

The plurality of trunk satellites 120 can include various numbers of trunk satellites. The number of trunk satellites 120 in the specified MEO orbital plane 125 may be selected based on the data transmission requirements of a given implementation. In general, the number of trunk satellites 120 in the specified MEO orbital plane 125 can include a sufficient number of trunk satellites 120 to enable satellite inter-links to be established along the entire MEO orbital plane 125. In some examples, the plurality of trunk satellites 120 in the specified MEO orbital plane 125 may include at least four trunk satellites. In some examples, the plurality of trunk satellites 120 in the specified MEO orbital plane 125 include at least eight trunk satellites.

The communication system 100 may also include, or communicate with, one or more specified ground stations 155 on the Earth. The trunk satellites 120 can be configured to establish optical communication with the specified ground station(s). A trunk satellite 120 having established optical communication with a ground station may be referred to as a relay trunk satellite. The relay trunk satellite may be configured to transfer data to and from the corresponding grounds station(s) 155 with which optical communication has been establish.

At any time, at least one of the trunk satellites 120 operates as a relay trunk satellite in position to maintain optical communication with a specified ground station (e.g. ground station 155) on the Earth. For example, trunk satellite 120c may be configured to operate as the relay trunk satellite that maintains optical communication with ground station 155 at the given time illustrated in FIG. 1 (and in FIG. 8).

Referring now to FIG. 2, shown therein is an example data communication system 200. The example data communication system 200 shown in FIG. 2 illustrates a simplified schematic of a portion of the optical data communication system 100. In particular, data communication system 200 illustrates a plurality of LEO satellites 110c5-110c7 and a plurality of trunk satellites 120c-120d.

The plurality of LEO satellites 110c5-110c7 include a subset of the LEO satellites within a specified LEO orbital plane 107 as shown in FIG. 8. As shown in FIG. 2, each of the LEO satellites 110c includes LEO inter-satellite links 115c with at least one other LEO satellite 115c in the specified LEO orbital plane 107. Each LEO satellite 110 can include LEO inter-satellite links 115 with a pair of adjacent LEO satellites 110. In the example illustrated, LEO satellite 110c6 includes a first LEO inter-satellite link 115c56 with a first adjacent LEO satellite 110c5. LEO satellite 110c6 also includes a second LEO inter-satellite link 115c67 with a second adjacent LEO satellite 110c7. As shown in FIG. 8, the first adjacent LEO satellite 110c5 is spaced apart from the LEO satellite 110c6 in a first direction along the orbital plane 107 and the second adjacent LEO satellite 110c7 is spaced apart from the LEO satellite 110c6 in a second direction along the orbital plane 107.

As noted above, each of the LEO satellites 110 can be configured to acquire satellite-specific data. The communication system 100 may be configured to route this satellite-specific data to one or more specified ground stations 155. Accordingly, the LEO satellites 110 may relay the data to the specified ground stations via trunk satellites 120.

In embodiments described herein, one or more LEO satellites 110 within a specified orbital plane can be configured to establish optical communication with a corresponding trunk satellite 120 at a given time. These relay LEO satellites 110 can be configured to relay aggregated satellite-specific data to the corresponding trunk satellite 120. The corresponding trunk satellite 120 can then be configured to route the aggregated satellite-specific data to a specified ground station 155, either directly or by relaying the data through the trunk satellites 120 in the MEO orbital plane.

The relay LEO satellite may be determined as the LEO satellite or satellites capable of establishing optical communication with the corresponding trunk satellite 120 at the given time. As explained in further detail below, LEO satellites 110 may have a limited field of regard 250 within which they are capable of establishing optical data communication with a trunk satellite 120. Accordingly, an LEO satellite 110 may operate as a relay LEO satellite only while the corresponding trunk satellite is within this limited field of regard.

As shown in FIG. 2, relay LEO satellite 110c6 can be configured to establish optical communication with the corresponding trunk satellite 120d at the given time illustrated. The relay LEO satellite 110c6 may be the LEO satellite nearest to the corresponding trunk satellite at that given time (see e.g. FIG. 8). Alternately or in addition, the relay LEO satellite 110c6 may be the LEO satellite in a portion of the specified orbital plane 107 that is closest to the equator 150 at the given time (see e.g. FIG. 8).

Typically, a single relay LEO satellite within a portion of an orbital plane may be configured to establish optical communication with a corresponding trunk satellite at a given time. However, the portion of the orbital plane corresponding to the relay LEO satellite may vary depending on the configuration of the LEO constellation and/or the current position of the LEO satellites at a given time.

The plurality of LEO satellites 110c can be configured to provide aggregate satellite-specific data to the relay LEO satellite by relaying the satellite specific data from each LEO satellite 110c in at least a portion of the specified orbital plane 107 to that relay LEO satellite. The relay LEO satellite may then relay the aggregate satellite-specific data to the corresponding trunk satellite 120.

In the example illustrated in FIG. 8, relay LEO satellite 110c6 can be configured to establish an optical communication link 252 with the corresponding trunk satellite 120d at the given time illustrated. The plurality of LEO satellites 110c may be configured to provide aggregate satellite-specific data to the relay LEO satellite 110c6 by relaying the satellite specific data from each LEO satellite 110c3-110c8 in a half of the specified orbital plane 107 to that relay LEO satellite 110c6.

As also illustrated in FIG. 8, relay LEO satellites 110c11 and 110c12 may both be configured to establish optical communication with the corresponding trunk satellite 120a at the given time illustrated. The plurality of LEO satellites 110c may be configured to provide aggregate satellite-specific data to the relay LEO satellite 110c11 by relaying the satellite specific data from each LEO satellite 110c10-110c9 in a quarter of the specified orbital plane to that relay LEO satellite 110c11. Similarly, the plurality of LEO satellites 110c may be configured to provide aggregate satellite-specific data to the relay LEO satellite 110c12 by relaying the satellite specific data from each LEO satellite 110c1-110c2 in a quarter of the specified orbital plane to that relay LEO satellite 110c12.

For each at least a portion of the specified orbital plane 107, at least one of the LEO satellites 110c in that at least a portion of the specified orbital plane is not in optical communication with any trunk satellite at each given time. For instance, LEO satellites 110c1-110c2, 110c3-110c5, 110c7-110c8, and 110c10-110c9 may not be in optical communication with any trunk satellites at the given time illustrated in FIG. 8.

As the LEO satellites 110 move along the specified orbital plane 107, the relay LEO satellites will change. Accordingly, the nearest relay LEO satellite for a given LEO satellite 110 within the orbital plane can change as well. Accordingly, each LEO satellite 110 can be configured to relay data in either direction around the specified LEO orbital plane 107.

As noted above, the communication system 200 can include one or more specified ground stations 155 on the Earth. The trunk satellites 120 can be configured to operate as relay trunk satellites that establish optical communication with the specified ground station(s) 155. In some examples, multiple trunk satellites 120 may operate as relay trunk satellites concurrently. For example, each relay trunk satellite may establish optical communication with one or more corresponding ground stations.

In the example illustrated, the trunk satellite 120d has established an optical communication link 232a with a first specified ground station 155a. Accordingly, at the time illustrated in FIG. 2, the trunk satellite 120d is configured to operate as the relay trunk satellite corresponding to the first specified ground station 155a. The trunk satellite 120d may then be configured to relay received aggregate satellite-specific data to the corresponding ground station 155a.

In addition, the trunk satellite 120e has established an optical communication link 232b with a second specified ground station 155b. Accordingly, at the time illustrated in FIG. 2, the trunk satellite 120e is configured to operate as the relay trunk satellite corresponding to the second specified ground station 155b. The trunk satellite 120e may then be configured to relay received aggregate satellite-specific data to the corresponding ground station 155b.

For example, the satellite-specific data may include data destined for different ground stations 155. Accordingly the trunk satellites 120 may be configured to route the received aggregate satellite-specific data (or a portion thereof) to the respective relay trunk satellite(s) corresponding to the destination ground station. The relay trunk satellites may then transmit the received aggregate satellite-specific data (or relevant portion thereof) to the corresponding destination ground station.

In some examples, the corresponding trunk satellite (that receives data from the relay LEO satellite) may be different from the relay trunk satellite (that relays data to a corresponding ground station). Accordingly, the plurality of trunk satellites 120 can be configured to relay the received aggregate satellite-specific data to the relay trunk satellite using the MEO inter-satellite links 122.

In the example shown in FIG. 2, the trunk satellite 120d can be configured to receive aggregate satellite-specific data from the relay LEO satellite 110c6. However, the aggregate satellite-specific data may be intended for a ground station (such as ground station 155b) that is not in optical communication with trunk satellite 120d. Accordingly, the received aggregate satellite-specific data can be relayed to trunk satellite 120e that operates as the relay trunk satellite corresponding to ground station 155b. Trunk satellite 120e may then relay the received aggregate satellite-specific data to ground station 155b using optical communication link 232b.

To provide inter-satellite links, each satellite (LEO satellite 110 and/or MEO satellite 120) can be provided with multiple optical signal terminals (that can be used for signal transmission/acquisition) also referred to herein as communication terminals. The terminals may be positioned at various locations on each satellite, such as the corners of the satellite or in the middle.

Each LEO satellite 110 may include a plurality of optical terminals including at least a pair of intraorbital optical terminals and a plurality of additional optical terminals. The intraorbital optical terminals may be configured to establish an intraorbital optical data link to an adjacent LEO satellite 110 within the same specified orbital plane. For example, the intraorbital optical terminals may be provided using fore- and aft-pointing OISL terminals. The additional terminals may include a first additional terminal (e.g. a first additional optical terminal) configured to establish an additional communication link (e.g. an additional optical communication link) to a location external to the specified orbital plane (e.g. to receive signals from external communication systems or devices, and/or acquire images of locations on Earth). The additional optical terminals may also include a second additional optical terminal configured to establish an additional optical link to a corresponding trunk satellite.

Each MEO satellite 120 may include a plurality of optical terminals including at least a pair of intraorbital optical terminals and a plurality of additional optical terminals. The intraorbital optical terminals may be configured to establish an intraorbital optical data link to an adjacent MEO satellite 120 within the same specified MEO orbital plane. For example, the intraorbital optical terminals may be provided using fore- and aft-pointing OISL terminals. Each additional optical terminal can be configured to establish an additional optical link to location external to the specified orbital plane (e.g. to receive signals from external communication systems or devices, and/or acquire images of locations on Earth). The additional optical terminals may include one or more ground station optical terminals configured to establish an optical link to a corresponding trunk ground station. The additional optical terminals can also include a plurality of LEO optical terminals configured to establish an optical link to a corresponding relay LEO satellite.

For each communication terminal, the satellite can include a telescope assembly to connect the external optics (e.g. the signal output/signal input optics) to internal communication systems. The signals from the telescope assembly can be aimed towards a destination (e.g. a neighboring satellite, a ground station, alternate locations) using a beam deflector (e.g. a coarse pointing assembly) provided by the corresponding communication terminal.

Each communication terminal may require associated high precision optical telescope assemblies, support structures, and mounting. In some cases, elements of the optical telescope assemblies, support structures, and mounting may be combined for two or more terminals.

Optical communication systems deployed for FSO communication allow data to be exchanged across air mediums and/or a vacuum. For example, optical communication terminals may be installed on satellites orbiting a ground (e.g., earth) reference, and may allow transmission and/or reception of optical signals across vacuum (e.g., space) as between multiple satellites. The communication terminals installed on satellites may also allow the satellites to communicate across a vacuum and/or air medium with airborne objects (e.g., an aircraft), or ground-based terminals (e.g., mobile or stationary). In some examples, the terminals may be transmitting and/or receiving signals within different wavelength bands and/or otherwise using different modulation schemes.

As noted above, each LEO satellite 110 may have a limited field of regard to establish optical communication with any trunk satellite 120 in the plurality of trunk satellites. That is, the second additional optical terminal for each LEO satellite 110 can have a limited field of regard 250. The field of regard generally refers to the total area through which an optical data link can be established by the second additional optical terminal. The field of regard is defined as the total area that the second additional optical terminal can perceive by adjusting the pointing direction of that terminal through a coarse pointing assembly. The field of regard may be generally larger than the field of view that is perceived by the optical terminal at any given instant. Limiting the field of regard of each LEO satellite 110 may significantly simplify the design of the pointing assembly on the LEO satellite 110.

In embodiments described herein, the second additional optical terminal for each LEO satellite 110 may have a limited field of regard around the zenith of that satellite. That is, as the LEO satellite 110 traverses its orbit along the corresponding orbital plane, an optical link with a trunk satellite may only be established while the trunk satellite remains within that field of regard above the LEO satellite 110.

In some examples, the limited field of regard may at most +/−45 degrees around a zenith of each LEO satellite. In some examples, the limited field of regard may in a range between above +/−30 degree and +/−45 degrees around a zenith of each LEO satellite.

Optical communication terminals deployed in FSO communication links can include at least an optical transmission subsystem, and an optical reception subsystem. Optical transmission subsystems encode data into an optical signal, and transmit the encoded optical data to an external destination (e.g., a satellite, airborne object or ground terminal). Transmission subsystems may include, for example, a laser source to encode and transmit the data information. Optical reception subsystems receive optical signals transmitted from external sources, and can decode the optical signals to extract encoded data. In various cases, the reception subsystem may include photodetectors and/or coherent receivers. In some cases, optical communication terminals may also include additional components to further facilitate transmission and/or reception of optical signals. For example, communication terminals may include an optical train (e.g., optical assembly) of elements for guiding and magnifying/de-magnifying transmitted and/or received beams (also known as the "telescope"). Coarse and fine pointing assemblies can also be included for enhanced and precise re-direction of transmitted and/or received signals.

Each satellite can also include a plurality of external optical assemblies. The external optical assemblies can be configured to transmit and/or receive signals from external locations and/or systems. For example, the external optical assemblies may be configured to communicate with external communication systems such as other satellites. Alternately or in addition, the external optical assemblies may be configured to acquire signals from specified locations (e.g. images of specific locations). The external optical assemblies may include the external communication terminals as well as the optical components used to direct signals through those external terminals.

Each external optical assembly may be configured to direct optical signals from a corresponding internal aperture in a corresponding external direction. Each external optical assembly and telescope assembly may be configured to transmit outgoing optical signals through an external communication terminal along the corresponding external direction.

Each external optical assembly may also be configured to receive incoming optical signals through an external communication link from the corresponding external direction. The external optical assembly and telescope assembly can be configured to direct the incoming optical signals received from the corresponding external direction to the corresponding internal aperture.

The external direction for each external optical assembly may be independently controllable. For example, the telescope assembly may define a telescope field of view. This field of view may be adjustable through a range of angular directions. The external directions may be adjusted to target different communication systems (e.g. neighboring satellites) and/or locations of interest (e.g. imaging locations). The range of angular directions for each communication terminal may vary in different embodiments. However, the range of angular directions for an optical communication terminal can be limited by the corresponding field of regard for that terminal.

Figure 3A:
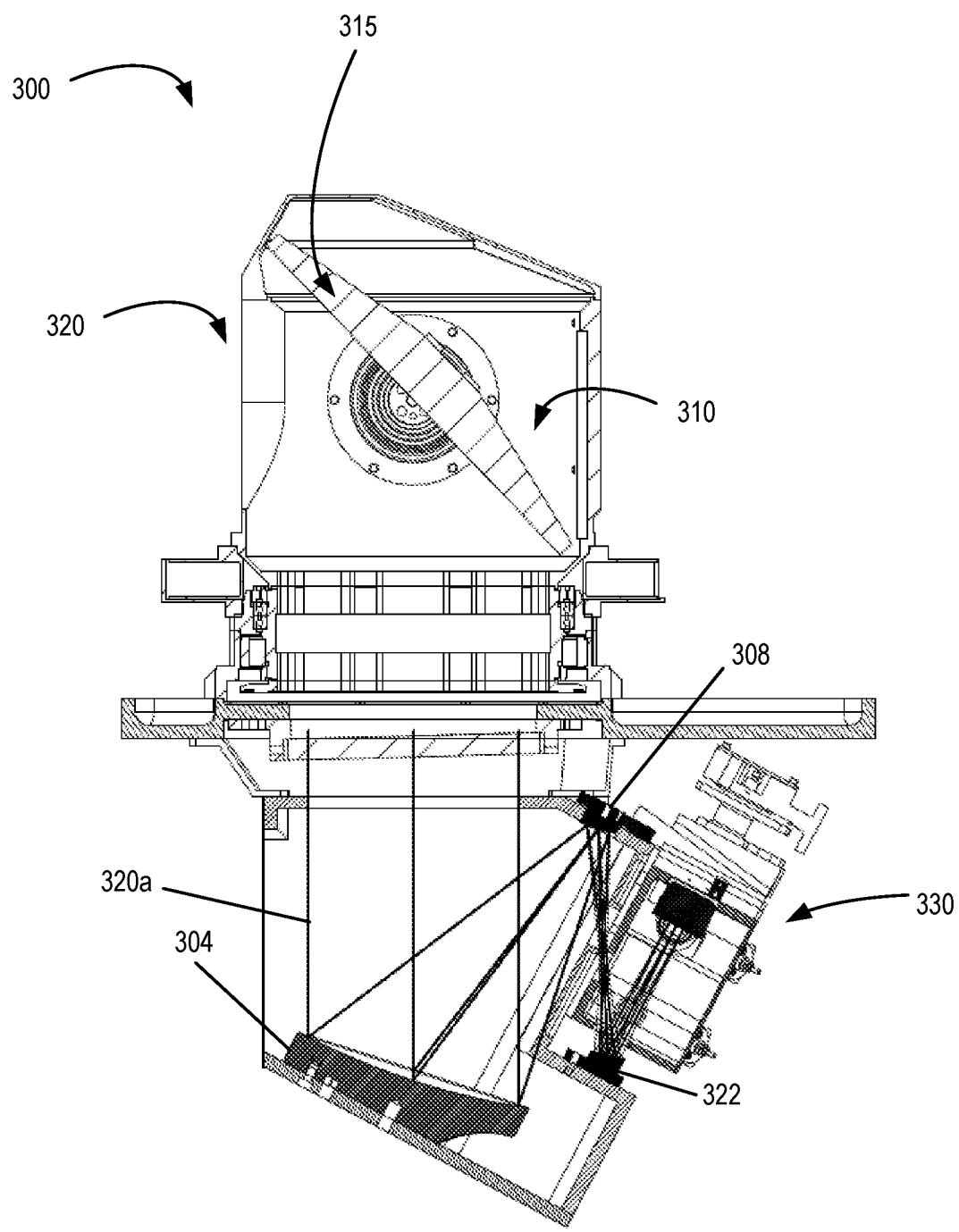
FIG. 3A shows a sectional view of an example signal transmission terminal assembly that may be used in the optical communication system of FIG. 1.

Referring now to FIG. 3A, shown therein is an example of a terminal section 300 of an optical communication system also referred to as an optical terminal or optical communication terminal. The terminal section 300 may be used with various optical communication systems described herein, such as an LEO satellite 110 and/or a trunk satellite 120. The terminal section illustrates the configuration of the portion of the optical communication system corresponding to an individual communication terminal. As will be appreciated, various optical communication systems described herein, such as an LEO satellite 110 and/or a trunk satellite 120 may include multiple communication terminals.

Terminal section 300 shown in FIG. 3A illustrates an example communication terminal in which a telescope assembly is provided that is specific to that terminal. However, alternate embodiments may be employed where elements of a telescope assembly are shared between two or more communication terminals.

In the example illustrated, the terminal section 300 extends between an external communication opening (or aperture) 320 and internal couplings 334 (not shown in FIG. 3A) connected to a fine pointing assembly 330. As shown, the terminal section 300 includes a coarse pointing assembly 310, a telescope assembly section (in this example including first mirror 304, second mirror 308, and third mirror 322), and a fine pointing assembly 330. Optical signals 320a can be transmitted between the opening 320 and the input couplings via the coarse pointing assembly 310, telescope assembly, and fine pointing assembly 330.

Optical signals (e.g. laser light) can be directed via fiber couplers (not shown) into the fine pointing module 330. The optical signals can then be directed to the telescope assembly, where it can be magnified (e.g. by 13.3× in the illustrated example). The magnified optical signals can then be directed through the coarse pointing assembly 310. The magnified light can then contact the mirror 315 and exit the coarse pointing assembly 310 through opening 320.

The reverse process can be performed for incoming aperture-specific signals arriving at the opening 320 of each communication terminal. Optical signals (e.g. laser light capture images) can be received through opening 320 and contact the mirror 315 where it is redirected through the coarse pointing assembly 310 to the telescope assembly. The optical signals can then be de-magnified and directed into the fine pointing module 330. The optical signals can then be coupled into control and/or processing systems, e.g. through fiber couplings.

In the example illustrated, the coarse pointing assembly 310 is an example of an external optical assembly that may be used with a communication system that includes a telescope assembly. The coarse pointing assembly 310 can be actuated to control the external communication direction of the corresponding communication path. The range of motion enabled by the coarse pointing assembly 310 may effectively define the field of regard for the corresponding optical terminal.

Each communication path in a communication system including a telescope assembly can be configured to travel through an independently actuated coarse pointing assembly 310. For example, each communication path may be directed through an independently controllable beam deflector that is adjustable to define the external communication direction of the corresponding communication path. Each communication path in a communication system may also include an independent fine pointing assembly 330.

Each external optical assembly may be adjustable between a range of angular directions. Alternately or in addition, each external optical assembly may be adjustable between a plurality of elevation angles within an elevation angular range. The range of angular directions and/or elevation angles can allow each external optical assembly to point towards a range of locations external to the optical system. The specific angular range and/or elevation range of each external optical assembly may vary depending on the particular implementation. For example, the size of the overall communication system may be adjusted to account for desired angular ranges (e.g. the size may be increased to increase the angular range available to each external optical assembly).

Although for ease of exposition, the communication terminal is described herein in the context of an optical communication system it should be understood that the communication terminal may also be used in various other optical systems, such as optical imaging systems.

Figure 3B:
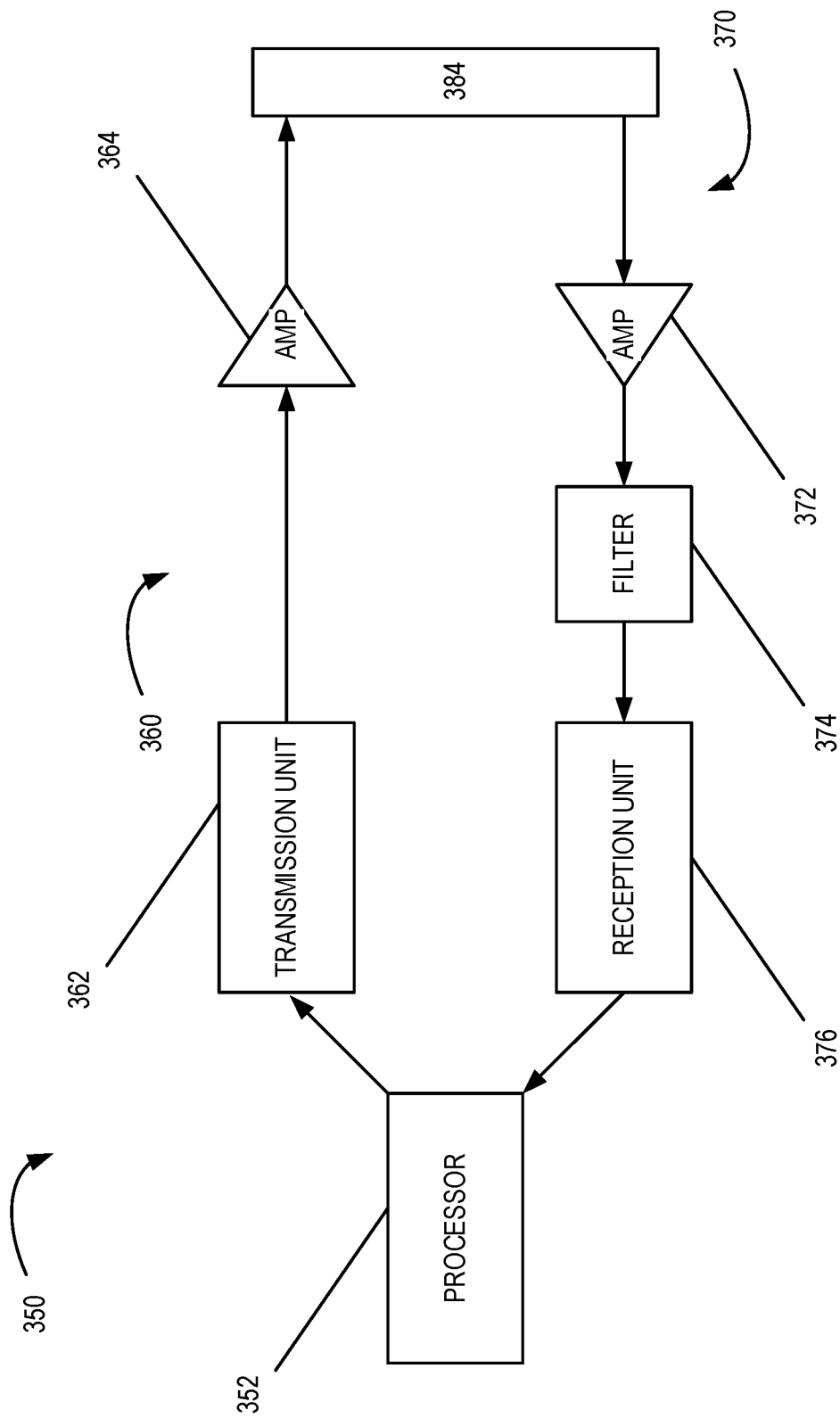
FIG. 3B shows a block diagram of an example signal transceiver unit that may be used in the optical communication system of FIG. 1.

Referring now to FIG. 3B, shown therein is an example of a signal transceiver unit 350 in accordance with an embodiment. The signal transceiver unit 350 is an example of a transceiver unit that may be included in components of an optical communication system, such as an LEO satellite 110 and/or trunk satellite 120. The signal transceiver unit 350 may be used in conjunction with an optical system that includes one or more telescope assemblies and one or more optical communication terminals, such as the optical terminals 300 described herein above. For example, signal transceiver unit 350 may be used to provide an optical laser communication system. In some cases, an LEO satellite 110 and/or trunk satellite 120 may include a single signal transceiver unit for all of the communication terminals included thereon. Alternately, an LEO satellite 110 and/or trunk satellite 120 may include multiple signal transceiver units, with each signal transceiver unit coupled to one or more communication terminals.

As shown in FIG. 3B, signal transceiver unit 350 can include a signal transmission path 360 and a signal reception path 370. The signal transmission path 360 and signal reception path 370 are coupled to an input aperture 384. The input aperture 384 can couple signals between the optical train of a telescope assembly and the signal transmission path 360 and signal reception path 370. Depending on the particular implementation of an optical system, a signal transceiver unit may be configured with only one of the signal transmission path 360 and signal reception path 370.

As shown in FIG. 3B, the signal transmission path 360 and signal reception path 370 are coupled to a processor 352 such as a modem. The processor 352 can be configured to perform various signal processing operations on the outgoing signal(s) to be transmitted through signal transmission path 360 and/or the incoming signal(s) received through signal reception path 370.

The signal transceiver unit 350 can be configured to convert the signals between an optical form (for transmission through the telescope assembly and external optical assembly) and alternate formats that may be used for internal transmission and/or communication to devices using other communication formats, such as Ethernet or radio-frequency formats for example.

Transmission unit 362 can be configured to convert outgoing signals from an alternate communication and/or processing format (e.g. Ethernet) into optical signals. The transmission unit 362 can be configured to modulate outgoing signals for transmission as an optical laser signal along signal transmission path 360. For example, transmission unit 362 may include a laser light source. Transmission unit 362 may also include an external or integrated optical modulator such as an electro-absorption modulator (EAM) or a Lithium Niobate Mach Zehnder external modulator for example. The optical modulator may be operable to modulate the laser light source to generate an outgoing optical laser signal to be transmitted along the signal transmission path 360 to aperture 384.

The outgoing optical laser signal can be further processed along the signal transmission path 360 before reaching the aperture 384 (i.e. before passing through a telescope assembly). For example, an optical amplifier 364 may be provided along the signal transmission path 360 to amplify the outgoing optical signals prior to entering the telescope assembly.

Reception unit 376 can be configured to convert incoming signals from optical signals into an alternate communication and/or processing format (e.g. Ethernet). The reception unit 376 can be configured to demodulate incoming optical laser signal(s) received through signal reception path 370. For example, the reception unit 376 can include a photodiode. Incoming optical signals can be received by the photodiode and a corresponding electrical signal can be generated in response. Reception unit 376 may also include various electrical signal processing components, such as an electrical amplifier and/or one or more signal filters (e.g. a bandpass filter).

The incoming optical laser signal may be further processed along the signal reception path 370 before reaching the reception unit 376. For example, the incoming optical signals may pass through an optical amplifier 372 after being received through aperture 384 (i.e. after passing through telescope assembly). The optical amplifier 372 can amplify the incoming optical signal before it reaches reception unit 376. The incoming optical signals may also pass through an optical filter 374. For example, optical filter 374 may be a bandpass optical filter. The optical filter 374 can be defined to remove noise and/or background signal components in the incoming optical signal before it reaches reception unit 376.

In some examples, the transmission unit 362 and reception unit 376 may be implemented using a combined transceiver module.

Processor 352 may be configured to perform various processing operations on the incoming and outgoing signals passing therethrough. For example, the processor 352 can be configured to perform various forward error correction operations on the incoming and/or outgoing signals.

Although the aperture 384 is shown as being separately coupled to the signal transmission path 360 and the signal reception path 370, it should be understood that additional optical components (e.g. beam splitters) may be used to provide a combined signal path that extends between the transmission path 360 and reception path 370 and aperture 384.

In some examples, the transceiver unit 350 may be configured to concurrently transmit/receive multiple signals along the signal transmission path 360 and the signal reception path 370 respectively.

In some examples, various signal modulation techniques (e.g. wavelength division multiplexing, polarization multiplexing etc.) may be used to allow multiple different signals to be communicated along a shared signal path (e.g. multiple signals may be concurrently transmitted along the signal transmission path 360, signal reception path 370, and/or a combined signal path).

Figure 4:
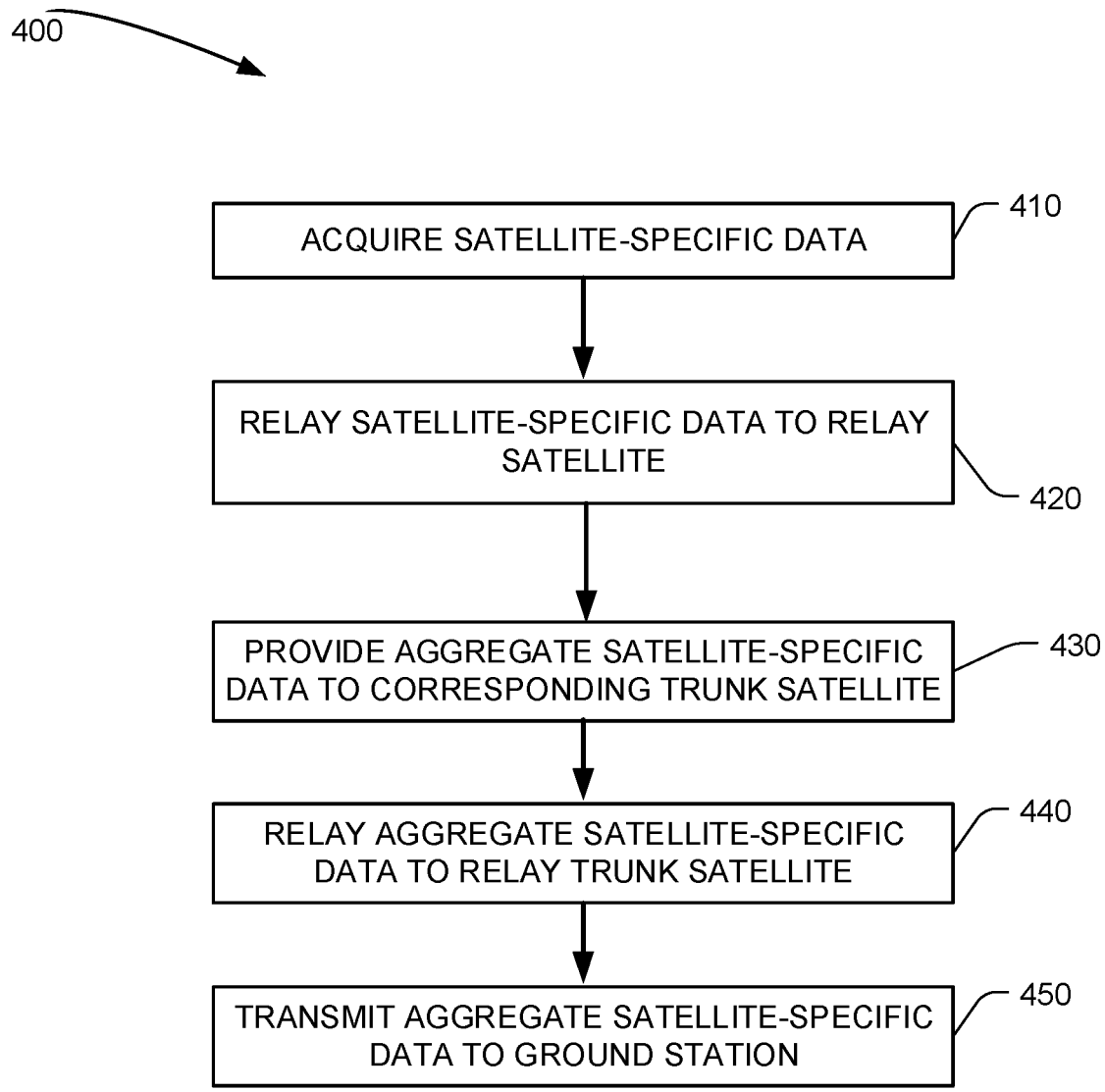
FIG. 4 is a flowchart illustrating an example communication process that may be implemented using the optical communication system of FIG. 1.

Referring now to FIG. 4, shown therein is an example data transmission process 400. The data transmission process 400 illustrated in FIG. 4 may be implemented by various elements of a data communication system, such as the LEO satellites 110 and trunk satellites 120 of optical data communication system 100 for example.

At 410, one or more LEO satellites 110 can acquire satellite specific data. Each LEO satellite 110 may be configured to acquire satellite specific data using an external signal acquisition aperture such as an optical terminal. In general, satellite specific data refers to data acquired by an LEO satellite 110 from sources other than the LEO satellites 110 on the same orbital plane. For instance, the satellite specific data acquired by a particular LEO satellite 110 may be acquired from one or more locations on Earth and/or one or more communication devices on Earth, airborne, or even other satellites that are not part of the same orbital plane (or even the same satellite constellation).

For instance, an LEO satellite 110 may be configured to acquire images of one or more locations on Earth as satellite-specific data. Alternately or in addition, an LEO satellite 110 may be configured to receive data signals from an external communication device (e.g. a ground station, mobile communication device, external satellite network etc.) as satellite-specific data.

The plurality of LEO satellites 110 with a given orbital plane can each be configured to acquire corresponding satellite-specific data. In some cases, the satellite-specific data acquired by the LEO satellites 110 within a given orbital plane may be acquired from different data sources. Alternately or in addition, the satellite-specific data acquired by two or more LEO satellites 110 within the same given orbital plane may be acquired from the same, or overlapping, data sources. This may occur, for instance, where different LEO satellites 110 pass over the same data sources at different time periods along their orbit.

At 420, the plurality of LEO satellites 110 can relay the satellite specific data to one or more relay LEO satellites. A relay LEO satellite can be defined as the LEO satellite 110 within a given orbital plane having established a communication link with a corresponding trunk satellite 120. In general, each relay LEO satellite may correspond to a portion of the satellites in a given orbital plane. Each relay satellite may be the LEO satellite within a portion (e.g. a quarter or a half) of the orbital plane that has an optical communication link established with a corresponding trunk satellite.

The plurality of LEO satellites 110 within the corresponding portion of the orbital plane can be configured to relay the satellite specific data (acquired by those LEO satellites at 110) to the corresponding relay LEO satellite. The satellite specific data can be relayed to the corresponding relay LEO satellite using the inter-satellite links established between adjacent LEO satellites in the portion of the orbital plane. This may include satellite-specific data being transmitted through one or more inter-satellite links from the LEO satellite having initially acquired the data to the relay LEO satellite.

The relay LEO satellite(s) and the corresponding portion of the orbital plane may vary dynamically as the LEO satellites traverse their orbit along the orbital plane. In general, each LEO satellite may be configured to transmit their respective satellite-specific data towards the nearest relay satellite (i.e. the relay satellite to which data can be transmitted using the fewest number of inter-satellite links). The nearest relay satellite for a given LEO will clearly change as the LEO satellite traverses its orbit.

In some examples, to simplify the routing procedure at each LEO satellite, an LEO satellite may transmit its satellite-specific data towards the equator (i.e. towards the LEO satellite within the same orbital plane that is nearest the equator). This may be desirable where the trunk satellites are positioned along an orbital plane that is proximate the equator. By relaying the satellite-specific data towards the equator, each LEO satellite (that is not a relay satellite) can be relatively assured that an efficient routing procedure may be achieved to reach the corresponding relay satellite.

This may allow the LEO satellite to easily determine which direction data should be transmitted. In addition, as the LEO satellites can establish optical communication links with adjacent LEO satellites in either direction along the orbital plane, each LEO satellite can be configured to transmit data in both directions along the orbital plane. This can allow the LEO satellite to easily adjust the direction of data transmission as its nearest relay satellite changes.

At 430, the relay satellite can provide the aggregate satellite-specific data received at 420 to the corresponding trunk satellite. The relay satellite can transmit the aggregate satellite-specific data to the trunk satellite using the optical communication link established therebetween. The relay satellite can also include the satellite-specific data acquired by that relay satellite at 410 as part of the aggregate satellite-specific data provided to the corresponding trunk satellite.

At 440, optionally the trunk satellite that received the aggregate satellite-specific data at 430 can relay the received aggregate satellite-specific data to a relay trunk satellite.

The plurality of trunk satellites can be configured to route the received aggregate satellite-specific data to one or more specified ground stations. For example, the specified ground stations may be ground stations located at secure locations (e.g. within specific regions) that allow data to be stored and analyzed securely. In order to transmit the data to a specified ground station, the plurality of trunk satellites can be configured to relay the received aggregate satellite-specific data to a relay trunk satellite that is positioned to maintain optical communication with the specified ground station. The received aggregate satellite-specific data can be relayed between the trunk satellites using the inter-satellite links established therebetween along the orbital plane.

In some cases, the corresponding trunk satellite may be positioned to maintain optical communication with the specified ground station. In such cases, the trunk satellite may not need to relay the received data to any other trunk satellites.

Alternately or in addition, some or all of the received aggregate satellite-specific data may be intended for a specified ground station that is not in optical communication with the corresponding trunk satellite. In such cases, the corresponding trunk satellite can be configured to relay the received aggregate satellite-specific data towards the relay trunk satellite that has established optical communication with the specified ground station suing the MEO inter-satellite links.

In some cases, the trunk satellites can be configured to route the received aggregate satellite-specific data bidirectionally around the orbital plane. That is, the received aggregate satellite-specific data may be routed in both directions around the orbital plane concurrently. This may ensure that the aggregate satellite-specific data can be transmitted to the desired ground station even in the case of a failure of one of the trunk satellites or of one of the MEO intersatellite links.

In some cases, transmitting all of the aggregate satellite-specific data bidirectionally around the orbital plane may increase data throughput demands undesirably. Accordingly, aggregate satellite-specific data may be routed to the relay trunk satellite using the shortest routing path in the absence of any faults or failures.

At 450, the relay trunk satellite can transmit aggregate satellite specific data to a ground station. The relay trunk satellite can transmit the aggregate satellite specific data to the specified ground station using the optical communication link established therewith.

Figure 5:
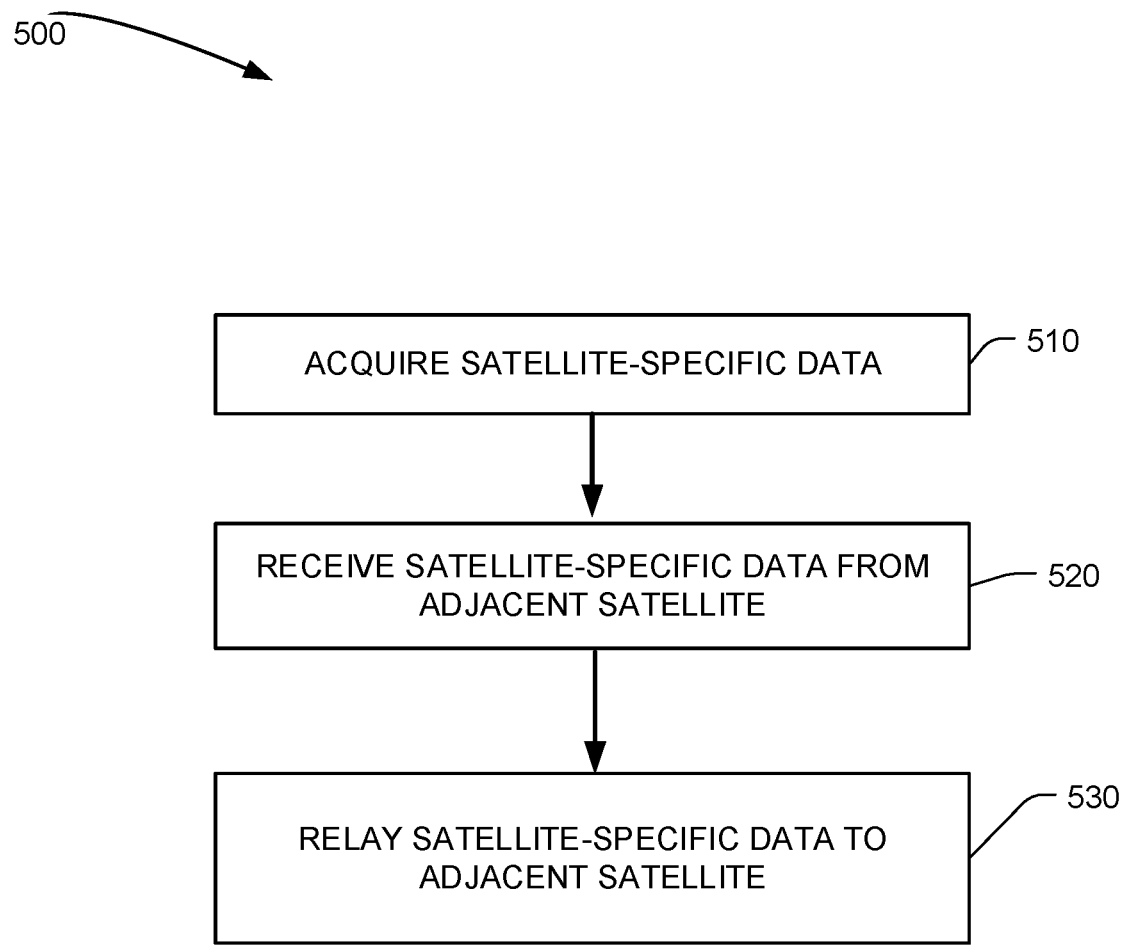
FIG. 5 is a flowchart illustrating an example communication process that may be implemented by a first satellite in the optical communication system of FIG. 1.

Referring now to FIG. 5, shown therein is an example communication process 500 that may be implemented in accordance with embodiments described herein. Process 500 may be implemented by a satellite usable to orbit Earth along a specified orbital plane. In general, the satellite can include a plurality of optical terminals. The plurality of optical terminals can include at least a pair of intraorbital optical terminals and a plurality of additional optical terminals. The plurality of additional optical terminals can include a first additional optical terminal and a second additional optical terminal. Each intraorbital optical terminal may be operable to establish an intraorbital optical data link to an adjacent satellite within the same specified orbital plane. Each additional optical terminal is operable to establish an additional optical link to a location external to the specified orbital plane, such as a satellite on a different orbital plane and/or other locations such as locations on earth. In general, the satellite can include a processor configured to operate the satellite in one or more modes of operation.

For example, process 500 may be implemented by aspects of an optical data communication system 100, such as an LEO satellite 110. In particular, the process 500 illustrates an example of a first mode of operation for an LEO satellite 110 that may be used in an optical data communication system 100.

At 510, the satellite may be configured to acquire satellite-specific data using the first additional terminal. As explained above, the satellite-specific data can be acquired from a location external to the orbital plane such as locations on Earth, satellites on other orbital planes, or other data communication systems or locations. The satellite-specific data may include one or more of received data signals, acquired images and the like. The satellite-specific data may be acquired as high resolution imaging data, and/or radar data, and/or using RF terminals to collect communications data from earth, and/or high resolution hyperspectral data. Accordingly, the first additional terminal may be a first additional optical terminal or a first additional terminal using a different data acquisition technology, such as an RF terminal.

At 520, optionally the satellite may receive aggregate satellite-specific data from at least one of the adjacent satellites in the same orbital plane. The aggregate satellite-specific data may be received from an adjacent satellite using one of the intraorbital optical terminals. The aggregate satellite-specific data may generally include satellite-specific data acquired by one or more of the other satellites orbiting within the same orbital plane.

At 530, the satellite can be configured to relay the satellite-specific data acquired at 510 to at least one of the adjacent satellites in the same orbital plane using at least one of the intraorbital optical terminals. The satellite may also be configured to relay any aggregate satellite-specific data received at 520 to adjacent satellites.

The satellite may be configured to relay the satellite-specific data using either of the intraorbital optical terminals. In some cases, the satellite may be configured to identify a nearest relay satellite in communication with a corresponding trunk satellite at a given time. The satellite may then select one of the intraorbital optical terminals for use in relaying the satellite-specific data based on a relative position of the satellite and the nearest relay satellite (i.e. to relay the satellite-specific data in the direction towards the nearest relay satellite).

The nearest relay satellite may be determined in various ways. For example, the nearest relay satellite may be determined dynamically through communication exchanged with other satellites within the same orbital plane. Alternately or in addition, the satellite may store data onboard that identifies the nearest relay satellite(s) for specified time periods (e.g. based on the known orbital path for each satellite within the same orbital plane). Alternately or in addition, the satellite may determine the nearest relay satellite using a proxy estimation for the nearest relay satellite. For example, the satellite may determine that the nearest relay satellite is proximate the equator and transmit the data towards the equator on this basis. This may be particularly relevant where the relay satellite is configured to communication with trunks satellites on an equatorial or near-equatorial orbit.

Figure 6:
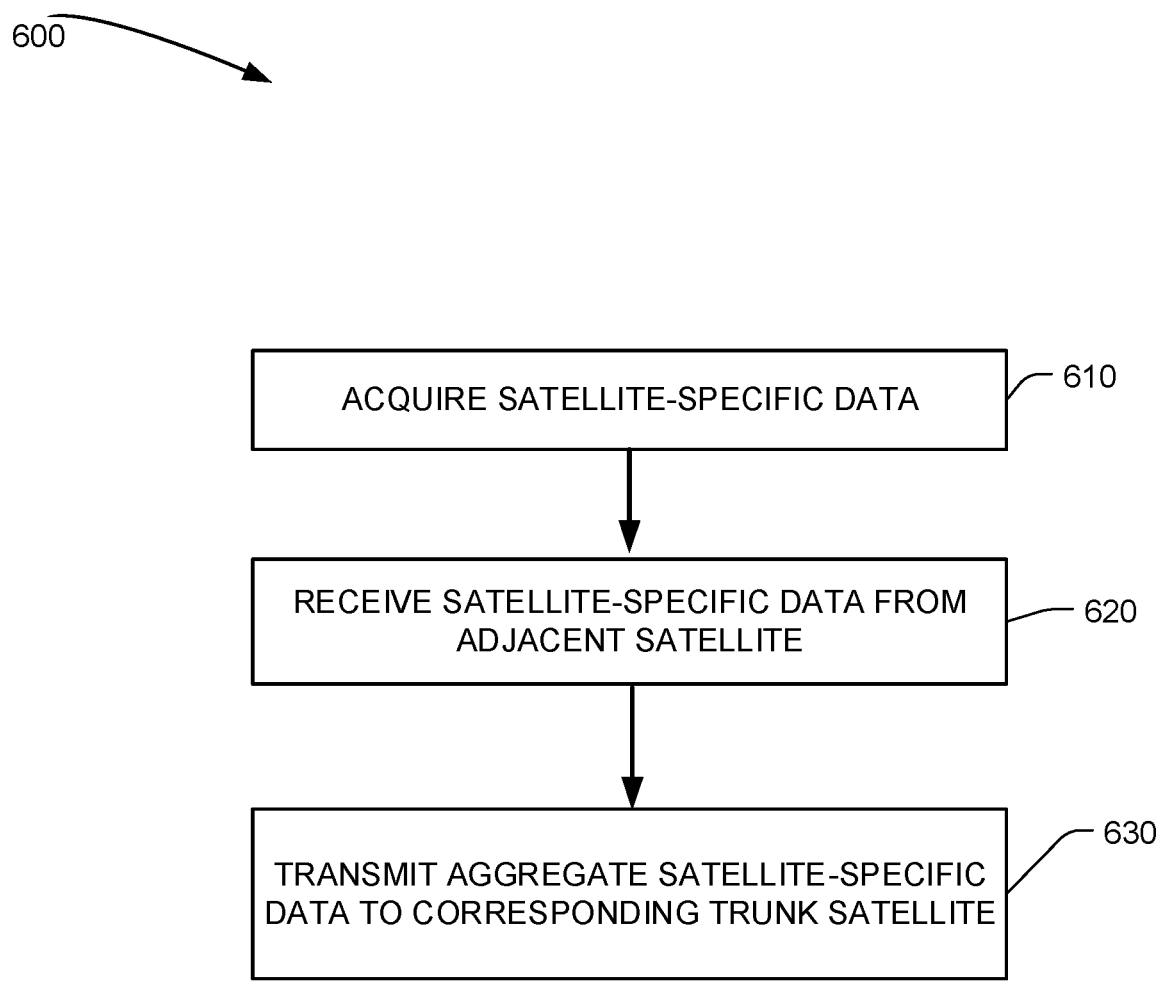
FIG. 6 is a flowchart illustrating an example communication process that may be implemented by the first satellite in the optical communication system of FIG. 1.

Referring now to FIG. 6, shown therein is an example communication process 600 that may be implemented in accordance with embodiments described herein. The process 600 may be implemented by aspects of an optical data communication system 100, such as an LEO satellite 110. In particular, the process 600 illustrates an example of a second mode of operation for an LEO satellite 110 that may be used in an optical data communication system 100. In the second mode of operation, the LEO satellite 110 can be configured to operate as a relay satellite to a corresponding trunk satellite 120.

At 610, optionally the satellite is configured to acquire satellite-specific data using the first additional terminal. The satellite may acquire the satellite-specific data in generally the same manner as described above at 510.

At 620, the satellite is configured to receive aggregate satellite-specific data from at least one of the adjacent satellites in the same orbital plane. The satellite can receive the aggregate satellite-specific data using one or both of the intraorbital optical terminals.

The satellite may receive aggregate satellite-specific data corresponding to all of the satellites in a portion of the same orbital plane. For instance, the satellite may receive aggregate satellite-specific data from LEO satellites in ¼ of the specified low-earth orbital plane. In some such cases, the satellite may receive the aggregate satellite-specific data through only one of the intraorbital optical terminals at a given time. In some cases, the satellite may receive aggregate satellite-specific data from LEO satellites in ½ of the specified low-earth orbital plane. In some such cases, the satellite may receive the aggregate satellite-specific data through both of the intraorbital optical terminals at a given time.

The portion of the LEO satellites from which the aggregate satellite-specific data is received may depend on the relative position of the LEO satellites along the orbital plane at the given point in time. For instance, where multiple relay satellites 110$c$12 and 110$c$11 are positioned to transmit data to a trunk satellite 120$a$, each relay satellite 110$c$12 and 110$c$11 may receive data from LEO satellites 110$c$ in ¼ of the specified low-earth orbital plane 107. Alternately, where only one relay satellite 110$c$6 is in position to communicate with a trunk satellite 120$d$, that relay satellite 110$c$6 may receive data from LEO satellites 110$c$ in ½ of the specified low-earth orbital plane 107. As the satellites 110$c$ traverse their orbit and the relay satellites change, the portions corresponding to each relay satellite (and the size of each portion) can change.

At 630, the satellite can be configured to relay the aggregate satellite-specific data (received at 620 and possible acquired at 610) to a trunk satellite in a different altitude of orbit around Earth using the second additional optical terminal. The relay satellite can relay the aggregate satellite-specific data to the trunk satellite while optical data communication is maintained therewith.

In some examples, the second additional optical terminal may have a limited field of regard to establish the additional optical link to the trunk satellite. Accordingly, the satellite may be configured to maintain optical communication with the trunk satellite only while the trunk satellite remains within this limited field of regard.

The satellite may also be configured to determine at a given time whether the satellite is a relay satellite in communication with a corresponding trunk satellite. Based on this determination, the satellite may operate in a first mode of operation (e.g. in response to determining that the satellite is not the relay satellite at the given time) where data is relayed to one or more adjacent LEO satellites or a second mode of operation (e.g. in response to determining that the satellite is the relay satellite at the given time) where data is received and relayed to the corresponding trunk satellite.

Figure 7:
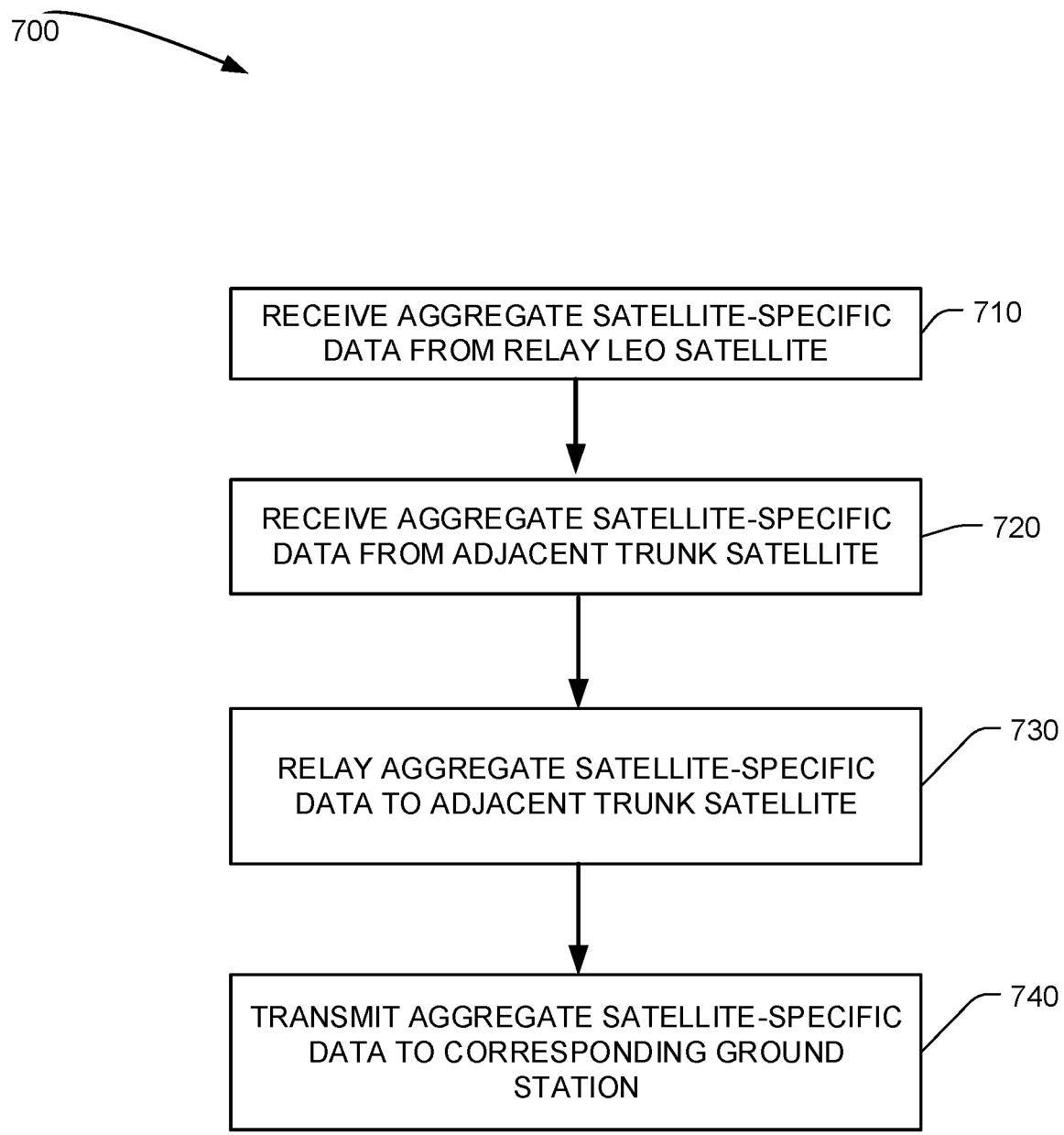
FIG. 7 is a flowchart illustrating an example communication process that may be implemented by a second satellite in the optical communication system of FIG. 1.

Referring now to FIG. 7 shown therein is an example communication process 700 that may be implemented in accordance with embodiments described herein. Process 700 may be implemented using a satellite configured to orbit Earth along a specified medium-earth orbital plane. The satellite may include a plurality of optical terminals. The plurality of optical terminals can include at least a pair of intraorbital optical terminals and a plurality of additional optical terminals. The plurality of additional optical terminals can include at least one first additional optical terminal and a second additional optical terminal. Each intraorbital optical terminal can establish an optical inter-link to an adjacent satellite within the same specified orbital plane. Each additional optical terminal may be operable to establish an optical link to a different optical communication system external to the specified orbital plane.

The satellite can also include a processor configured to operate the satellite. The satellite may be configured to establish an optical data link with at least one relay satellite in a different altitude of orbit around Earth using the at least one first additional optical terminal. The satellite can also establish optical data links with a plurality of additional MEO satellites spaced apart from the satellite along the specified medium-earth orbital plane using the intraorbital optical terminals.

In some examples, the at least one first additional optical terminal may include a plurality of first additional optical terminals. The satellite may use the first additional optical terminals to establish concurrent optical communication links with a plurality of relay satellites. In some examples, the plurality of first additional optical terminals may include at most six first additional optical terminals. This limited number of optical terminals may be enabled through the processes described herein.

The process 700 may be implemented by aspects of the optical data communication system 100, such as a trunk satellite 120. In particular, the process 700 illustrates an example of an operational process for a trunk satellite 120 that may be used in an optical data communication system 100.

At 710, the trunk satellite can receive aggregate satellite-specific data from one or more relay satellites in communication therewith. For example, the trunk satellite may establish optical communication links with one or more relay satellites within an LEO satellite constellation. Each relay satellite can be configured to relay aggregate satellite-specific data acquired by satellites in the same orbital plane to the trunk satellite.

The trunk satellite may be configured to monitor multiple relay satellites concurrently. In some cases, this may include relay satellites from multiple orbital planes. Accordingly, the trunk satellite may include separate optical terminals for each of the relay satellites being monitored. This may allow the trunk satellite to receive aggregate satellite-specific data from multiple relay satellites concurrently.

At 720, optionally the trunk satellite may receive relayed aggregate satellite-specific data from at least one of the additional trunk satellites in the same orbital plane. This relayed aggregate satellite-specific data may generally include aggregate satellite-specific data that was received by a different trunk satellite in the same MEO orbital plane that is intended for a ground station not in communication with the trunk satellite that received the aggregate satellite-specific data. The trunk satellite may be in communication with the corresponding ground station and/or may provide an intersatellite link towards the trunk satellite in communication with that corresponding ground station.

At 730, optionally the satellite may be configured to forward aggregate satellite-specific data to at least one of the additional MEO satellites using the intraorbital optical terminals. The trunk satellite can forward aggregate satellite-specific data received at 710 (as well as any aggregate satellite-specific data received at 720) that is intended for a ground station with which that trunk satellite does not have established optical communication.

The trunk satellite may be operable to relay the aggregate satellite-specific data using either of the intraorbital optical terminals. That is, the trunk satellite may be configured to relay the data in either direction around the MEO orbital plane. In some cases, the satellite may be configured relay the aggregate satellite-specific data using both of the intraorbital optical terminals concurrently. This may provide redundancy to the data transmission in case of any faults or failures in the MEO intersatellite links.

In some cases, the satellite may be configured determine whether the satellite is a ground relay satellite in communication with the specified ground-based optical communication system at a given time. For instance, the satellite may inspect a destination address associated with the aggregate satellite-specific data to determine whether the satellite is in communication with the specified ground-based optical communication system for that aggregate satellite-specific data. The satellite may then forward the aggregate satellite-specific data to at least one of the additional MEO satellites at the given time in response to determining that the satellite is not the ground relay satellite at the given time.

Alternately, at 740, the satellite may be configured to relay the relayed aggregate satellite-specific data to the ground-based optical communication system using the second additional optical terminal. The satellite may be configured to relay the relayed aggregate satellite-specific data to the ground-based optical communication system in response to determining that the satellite is the ground relay satellite at the given time. In some cases, the satellite may relay some aggregate satellite-specific data to the ground-based optical communication system and forward some aggregate satellite-specific data based on data associated with the aggregate satellite-specific data, such as destination address data.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A communication system comprising:
   (a) a plurality of LEO satellites in low-earth orbit around Earth in a specified LEO orbital plane, the plurality of LEO satellites spaced apart from one another along the specified orbital plane, wherein each LEO satellite is configured to acquire satellite-specific data and each LEO satellite includes LEO inter-satellite links with at least one other LEO satellite in the specified LEO orbital plane; and
   (b) a plurality of trunk satellites in a medium earth orbit around Earth in a specified MEO orbital plane, wherein each trunk satellite includes MEO inter-satellite links with at least one other trunk satellite in the specified MEO orbital plane, wherein at any time at least one of the trunk satellites operates as a relay trunk satellite in position to maintain optical communication with a specified ground station on the Earth;
   wherein each LEO satellite has a limited field of regard to establish optical communication with any trunk satellite in the plurality of trunk satellites;
   a relay LEO satellite from the plurality of LEO satellites is configured to establish optical communication with a corresponding trunk satellite at a given time;
   the plurality of LEO satellites are configured to provide aggregate satellite-specific data to the relay LEO satellite, the aggregate satellite-specific data corresponding to satellite-specific data from at least two LEO satellites, by relaying the satellite specific data from each LEO satellite in at least a portion of the specified orbital plane to that relay LEO satellite, the portion comprising at least two LEO satellites;
   the relay LEO satellite is configured to relay the aggregate satellite-specific data to the corresponding trunk satellite; and
   the relay trunk satellite is configured to relay the received aggregate satellite-specific data to the corresponding ground station, the relay trunk satellite being different from the corresponding trunk satellite.

2. The communication system of claim 1, wherein for each at least a portion of the specified orbital plane at least one of the LEO satellites in that at least a portion of the specified orbital plane is not in optical communication with any trunk satellite at every given time.

3. The communication system of claim 1, wherein the plurality of trunk satellites are configured to relay the received aggregate satellite-specific data to the relay trunk satellite using the MEO inter-satellite links.

4. The communication system of claim 1, wherein the plurality of LEO satellites are configured to provide aggregate satellite-specific data to the relay LEO satellite by relaying the satellite specific data from each LEO satellite in a quarter of the specified orbital plane to that relay LEO satellite.

5. The communication system of claim 1, wherein the relay satellite is the satellite in the portion of the specified orbital plane that is closest to the equator at the given time.

6. The communication system of claim 1, wherein:
for each LEO satellite, that LEO satellite includes LEO inter-satellite links with a first adjacent LEO satellite and a second adjacent LEO satellite, wherein the first adjacent LEO satellite is spaced apart from that LEO satellite in a first direction along the specified LEO orbital plane, and the second adjacent LEO satellite is spaced apart from that LEO satellite in a second direction along the specified LEO orbital plane; and
each LEO satellite is operable to relay data in either direction around the specified LEO orbital plane.

7. The communication system of claim 1, wherein the plurality of trunk satellites in the specified MEO orbital plane include at least four trunk satellites.

8. The communication system of claim 1, wherein the specified MEO orbital plane is proximate the equator.

9. The communication system of claim 1, wherein each trunk satellite is operable to relay data in either direction around the specified MEO orbital plane.

10. The communication system of claim 1, wherein the limited field of regard is at most +/−45 degrees around a zenith of each LEO satellite.

11. A satellite usable to orbit Earth along a specified orbital plane comprising:
(a) a plurality of terminals, the plurality of terminals including at least a pair of intraorbital optical terminals and a plurality of additional terminals including a first additional terminal and a second additional optical terminal, wherein each intraorbital optical terminal is operable to establish an intraorbital optical data link to an adjacent satellite within the same specified orbital plane, and each additional terminal is operable to establish an additional data link to a location external to the specified orbital plane;
(b) a processor configured to operate the satellite in a first mode of operation and a second mode of operation, wherein
i) in the first mode of operation, the satellite is configured to acquire satellite-specific data using the first additional terminal and to relay the satellite-specific data to at least one of the adjacent satellites in the same orbital plane using at least one of the intraorbital optical terminals;
ii) in the second mode of operation, the satellite is configured to receive aggregate satellite-specific data from at least one of the adjacent satellites in the same orbital plane, the aggregate satellite-specific data corresponding to satellite-specific data acquired by at least two other satellites in the same orbital plane, and to relay the aggregate satellite-specific data to a trunk satellite in a different altitude of orbit around Earth using the second additional optical terminal, the trunk satellite configured to transmit the aggregate satellite-specific data to a relay trunk satellite configured to relay the aggregate satellite-specific data to a corresponding ground station;
wherein the second additional optical terminal has a limited field of regard to establish the additional optical link to the trunk satellite.

12. The satellite of claim 11, wherein the satellite is configured to orbit Earth in a low-earth orbit and the trunk satellite is configured to orbit Earth in a medium earth orbit.

13. The satellite of claim 11, wherein
(a) the satellite is configured to orbit Earth in a specified low-earth orbital plane and to establish data communication with a plurality of additional LEO satellites spaced apart from the satellite along the specified low-earth orbital plane using the intraorbital optical terminals;
(b) the satellite is configured to:
i) determine whether the satellite is a relay satellite in communication with the trunk satellite at a given time;
ii) operate in the first mode of operation at the given time in response to determining that the satellite is not the relay satellite at the given time; and
iii) operate in the second mode of operation at the given time in response to determining that the satellite is the relay satellite at the given time.

14. The satellite of claim 13, wherein the relay satellite is identified as the particular satellite within the specified low-earth orbital plane nearest to the trunk satellite at the given time.

15. The satellite of claim 13, wherein in the first mode of operation the satellite is operable to relay the satellite-specific data using either of the intraorbital optical terminals.

16. The satellite of claim 15, wherein in the first mode of operation, the satellite is operable to determine a nearest relay satellite in communication with the trunk satellite at a given time, and to select one of the intraorbital optical terminals for use in relaying the satellite-specific data based on a relative position of the satellite and the nearest relay satellite.

17. The satellite of claim 13, wherein in the second mode of operation, the satellite is operable to receive data from the additional LEO satellites in ¼ of the specified low-earth orbital plane.

18. The satellite of claim 13, wherein the limited field of regard is at most +/−45 degrees around a zenith of the satellite while in orbit.

19. A satellite configured to orbit Earth along a specified medium-earth orbital plane comprising:
(a) a plurality of optical terminals, the plurality of optical terminals including at least a pair of intraorbital optical terminals and a plurality of additional optical terminals including at least one first additional optical terminal and a second additional optical terminal, wherein each intraorbital optical terminal is operable to establish an optical inter-link to an adjacent satellite within the same specified orbital plane, and each additional optical terminal is operable to establish an optical link to a different optical communication system external to the specified orbital plane; and (b) a processor configured to operate the satellite to:
  i) establish an optical data link with at least one relay satellite in a different altitude of orbit around Earth using the at least one first additional optical terminal;
  ii) receive aggregate satellite-specific data from each of the at least one relay satellite, the aggregate satellite-specific data corresponding to satellite-specific data acquired from at least two satellites in an orbital plane of the at least one relay satellite;
  iii) establish optical data links with a plurality of additional MEO satellites spaced apart from the satellite along the specified medium-earth orbital plane using the intraorbital optical terminals;
  iv) operate in a first mode of operation, wherein in the first mode of operation the satellite is configured to receive relayed aggregate satellite-specific data from at least one of the additional MEO satellites and to relay the relayed aggregate satellite-specific data to a ground-based optical communication system using the second additional optical terminal, wherein the relayed aggregate satellite-specific data comprises the aggregate satellite-specific data from at least one of the at least one relay satellite;
  v) operate in a second mode of operation separate from the first mode of operation, wherein in the second mode of operation, the satellite is configured to forward aggregate satellite-specific data to at least one of the additional MEO satellites using the intra-orbital optical terminals, the aggregate satellite-specific data comprising the received aggregate satellite-specific data from at least one of the at least one relay satellite.

20. The satellite of claim 19, wherein the processor is configured to:
  (a) determine whether the satellite is a ground relay satellite in communication with the ground-based optical communication system at a given time;
  (b) operate the satellite in the second mode of operation at the given time in response to determining that the satellite is not the ground relay satellite at the given time; and
  (c) operate the satellite in the first mode of operation at the given time in response to determining that the satellite is the ground relay satellite at the given time.

* * * * *